United States Patent [19]

Barbagelata et al.

[11] Patent Number: 4,814,970
[45] Date of Patent: Mar. 21, 1989

[54] MULTIPLE-HIERARCHICAL-LEVEL MULTIPROCESSOR SYSTEM

[75] Inventors: Giuseppe Barbagelata, Genova; Bruno Conterno, Genova-Rivarolo; Vildo Luperini; Enrico Perroni, both of Genova; Fernando Pesce; Osvaldo Pugliese, both of Genova-Sestri, all of Italy

[73] Assignee: Elettronica San Giorgio - Elsag S.p.A., Genova-Sestri, Italy

[21] Appl. No.: 939,173

[22] Filed: Dec. 8, 1986

[30] Foreign Application Priority Data

Dec. 13, 1985 [IT] Italy ................................ 68046 A/85

[51] Int. Cl.$^4$ ............................................. G06F 15/00
[52] U.S. Cl. ....................................................... 364/200
[58] Field of Search ... 364/200 MS File, 900 MS File

[56] References Cited
U.S. PATENT DOCUMENTS

| | | | |
|---|---|---|---|
| 4,130,865 | 12/1978 | Heart et al. | 364/200 |
| 4,240,143 | 12/1980 | Besemer et al. | 364/200 |
| 4,371,929 | 2/1983 | Brann et al. | 364/200 |
| 4,564,900 | 1/1986 | Snitt | 364/200 |

Primary Examiner—Thomas M. Heckler
Assistant Examiner—Rebecca L. Adams
Attorney, Agent, or Firm—Gifford, Groh, Sheridan, Sprinkle and Dolgorukov

[57] ABSTRACT

A multiple-hierarchical-level multiprocessor system having first numbers of processing modules comprising, each, at least one processor and connected to a first group of common direct-access communication lines for forming a first hierarchical level (family); a first processing module of each of the aforementioned first numbers also being connected to a second group of common direct-access communication lines for forming a second hierarchical level (region); a second number of the aforementioned second groups of common communication lines being interconnected via data transmitting and receiving means for forming a third hierarcical level (region network); the aforementioned means comprising at least one processor for enabling operation independent of the aforementioned modules.

28 Claims, 13 Drawing Sheets

| FLTF | MCLF | STOPF | STOPR | ONLN | ENMI | DW | TSC | 38 Fig.9a

| RAVL | ERF | HOTST | FAVL | SLVE | TOUT | ENMI | DW | 39 Fig.9b

| X | X | X | X | X | X | ERF | ONLN | ⎫ Fig.9c
| TYPE | TYPE | TYPE | TYPE | FLTF | X | X | LREQ | ⎬64

| 0 | 0 | 0 | 0 | 0 | F2 | F1 | F0 | ⎫ Fig.9d
| X | X | X | X | V3 | V2 | V1 | V0 | ⎬65

| CL7 | CL6 | CL5 | CL4 | CL3 | CL2 | CL1 | CL0 | 67,68 Fig.9e

| 0 | 0 | RNAVL | AB RESET | IPTYE | IBF | CIBC | IC | 104 Fig.9f

| 0 | 0 | 0 | RESET | OPTYE | START | COBC | OC | 105 Fig.9g

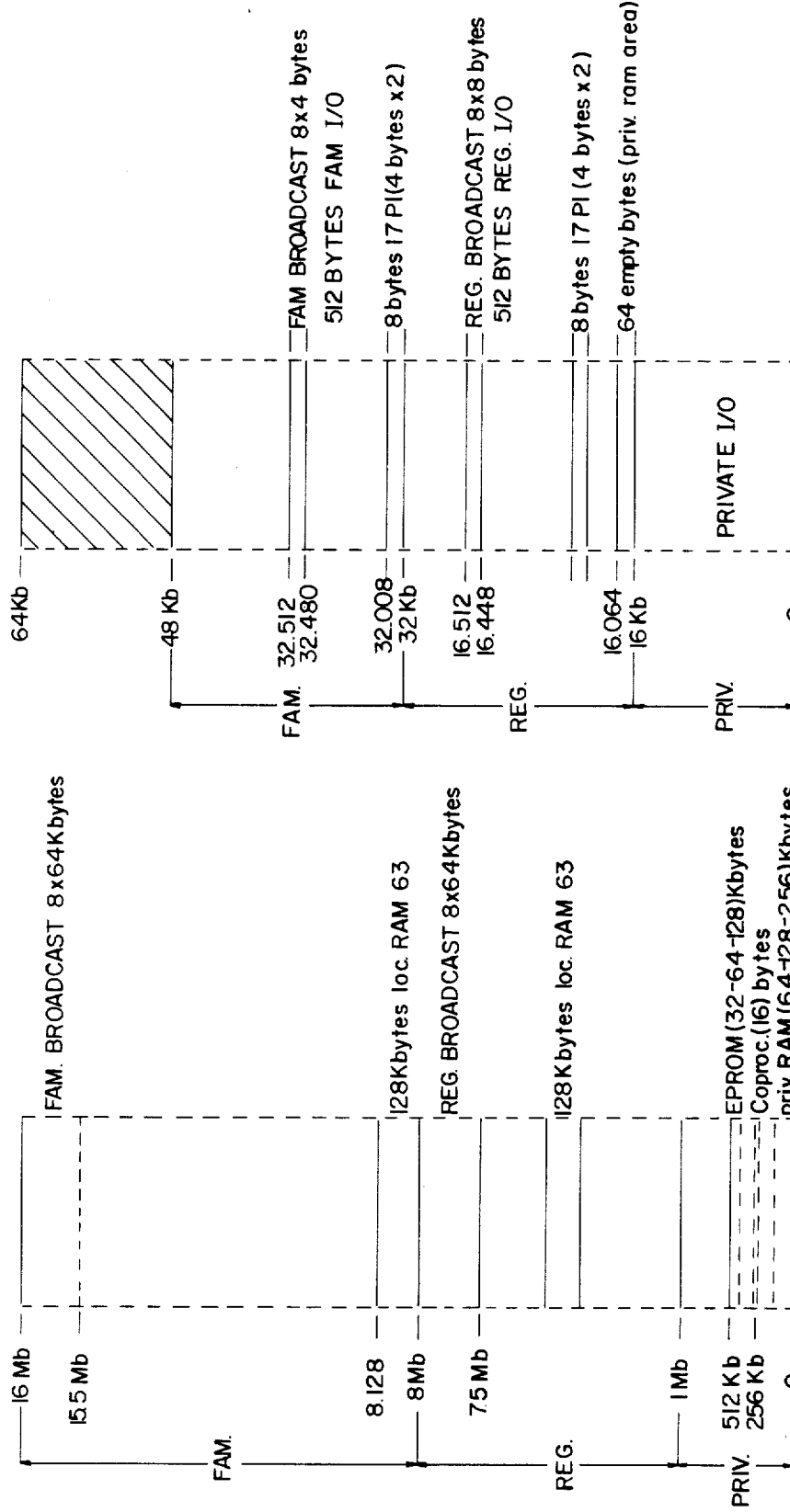

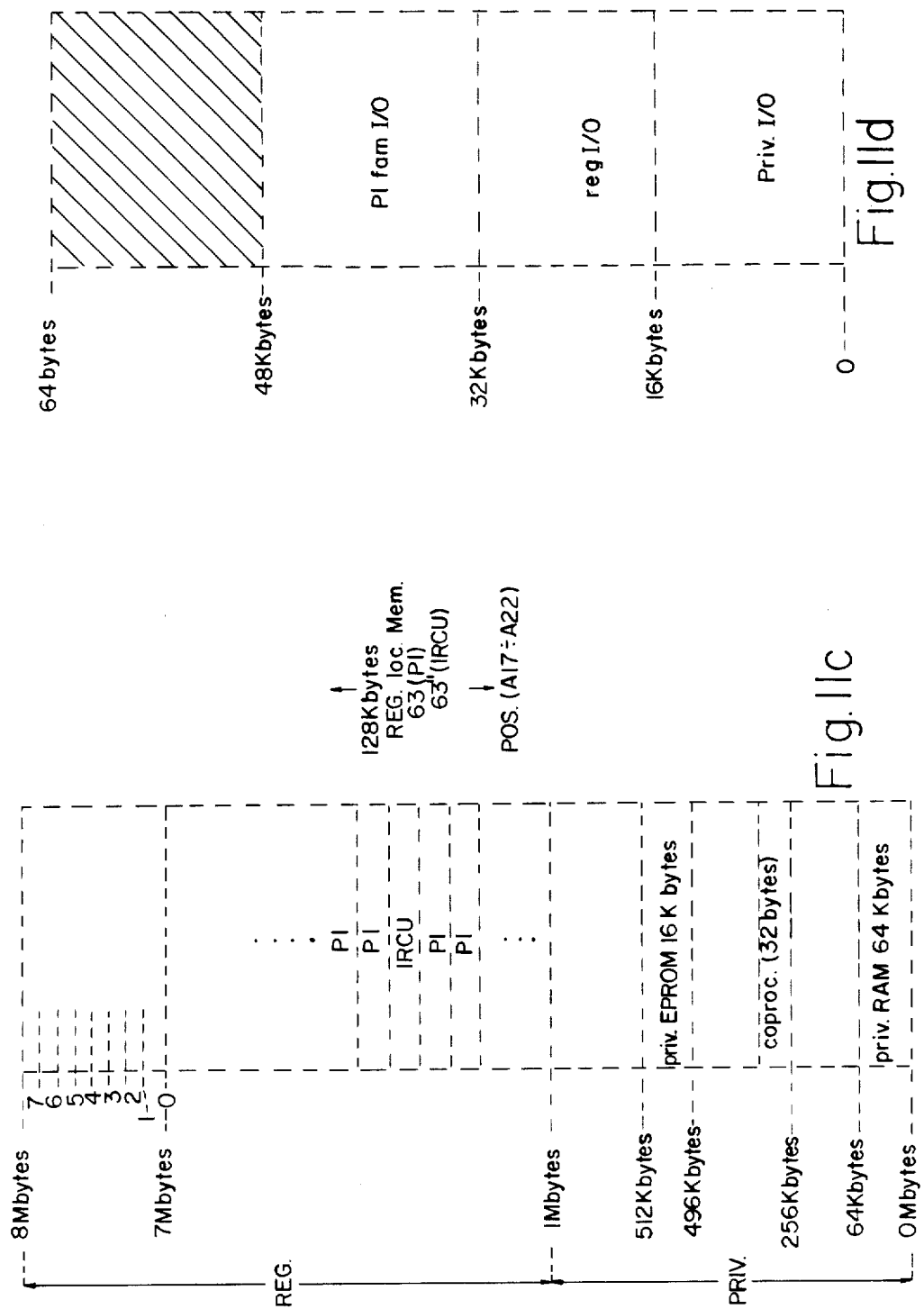

MULTIPLE-HIERARCHICAL-LEVEL MULTIPROCESSOR SYSTEM

BACKGROUND OF THE INVENTION

The present invention relates to a modular multiprocessor system of advanced multiple-hierarchical-level architecture, consisting of a number of elementary processing units varying (from a few to a few thousand) according to the application involved, and each cooperating with the others in high-efficiency manner, with common bus connections between the various processors and the memory.

A need is generally acknowledged for combining high computing power with the ability to handle large streams of in-coming and out-going data, particularly in applications involving complex real-time processing (e.g. image processing, pattern and voice recognition, artificial intelligence and scientific computation in general). The formation of high-computing-power multiprocessor systems poses various problems, including task division, processor communication, process cooperation and theoretical-versus-practical application feasibility, mainly due to conflicting access to common resources (communication lines and memories) due to simultaneous operation of a large number of processors. Known proposed solutions (many no more than theoretical) involve extremely high-cost systems (processor arrays and matrix-connected memories) which, in addition to being difficult to control, are unacceptable in terms of performance-cost ratios. Furthermore, when exchanging messages between various sections at a fairly high data rate, known systems have as yet failed to solve the problem of fully independent, transparent operation of communicating multiprocessor sections.

SUMMARY OF THE INVENTION

The aim of the present invention is to provide a multiprocessor system designed to overcome the aforementioned drawbacks; the extremely modular design of which provides for forming highly complex systems ensuring highly parallel processing and the computing power required for an extensive range of even the most sophisticated applications; and which provides for a greatly improved performance/cost ratio as compared with current known solutions. Further aims and advantages of the present invention will be disclosed in the following description.

With this aim in view, according to the present invention, there is provided a multiple-hierarchical-level multiprocessor system, characterized by the fact that it comprises first numbers of processing modules comprising, each, at least one processor and connected to a first group of common direct-access communication lines for forming a first hierarchical level (family); a first processing module of each of said first numbers also being connected to a second group of common direct-access communication lines for forming a second hierarchical level (region); a second number of said second groups of common communication lines being interconnected via data transmitting and receiving means for forming a third hierarchical level (region network); said means comprising at least one processor for enabling operation independent of said modules.

BRIEF DESCRIPTION OF THE DRAWINGS

One embodiment of the multiprocessor system according to the present invention will be described, by way of a nonlimiting example, with reference to the accompanying drawings, in which:

FIGS. 9a–9g show the content of various registers on the system described;

FIGS. 11a, b, c and d show schematic examples of address mapping arrangements for memory blocks and input/output blocks on the system according to the present invention.

DETAILED DESCRIPTION OF THE INVENTION

Figure 1:
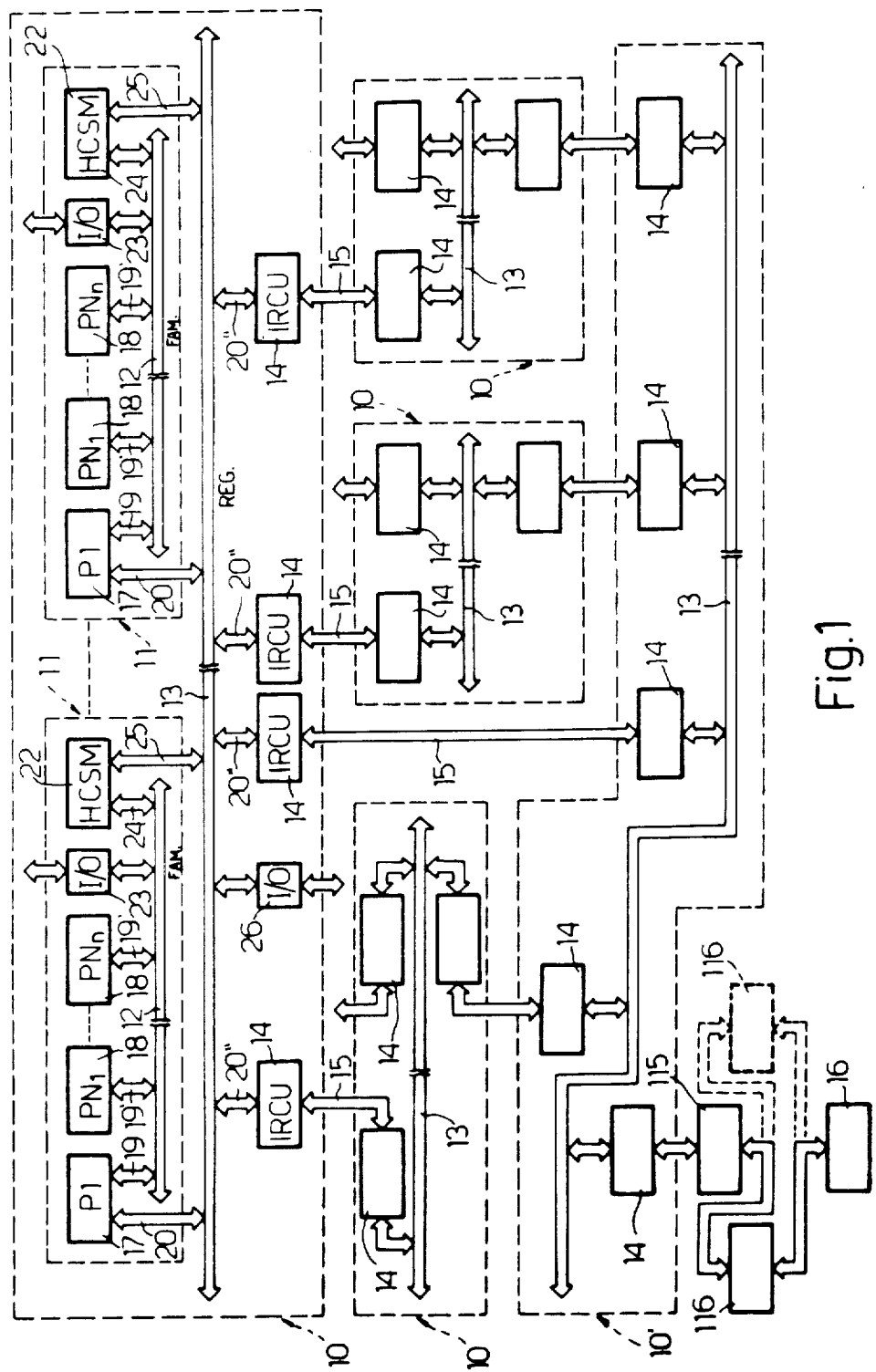
FIG. 1 shows a block diagram of the multiprocessor system according to the present invention.

With reference to FIG. 1, the multiprocessor system according to the present invention presents a common bus structure and is divided into a number of regions 10, each composed of a group of families 11. Each family consists of a number of processors accessible directly by a common bus 12 (family bus), and all the families 11 in one region 10 are, in turn, accessible directly via a common bus 13 (region bus). Within each region 10, the processors are connected tightly, i.e. affording direct visibility of the entire memory in the region, whereas different regions 10 are connected loosely, i.e. via messages exchanged via units 14 connected by lines 15. System monitoring and supervision functions are conveniently performed by a special region 10' connected, via units 14, to all the other regions 10 on the system, and, via modules described in more detail later on, to an external computer 16. Each family 11 comprises: a monoprocessor module 17 (P1) connected via lines 19 and 20 to family bus 12 and region bus 13 respectively; a number of multiprocessor modules 18 (PN) connected via lines 19' to family bus 12 only; a high-capacity memory block 22 (HCSM) conveniently of 8 Megabytes; and an input/output block 23 (I/O) for receiving and transmitting data from and to the application environment of the multiprocessor system. Memory block 22 is connected, via lines 24 and 25, to family bus 12 and region bus 13 respectively, whereas block 23 is connected solely to family bus 12. Region bus 13 may also be connected to input/output blocks 26 (I/O) for communicating with peripherals.

Figure 2:
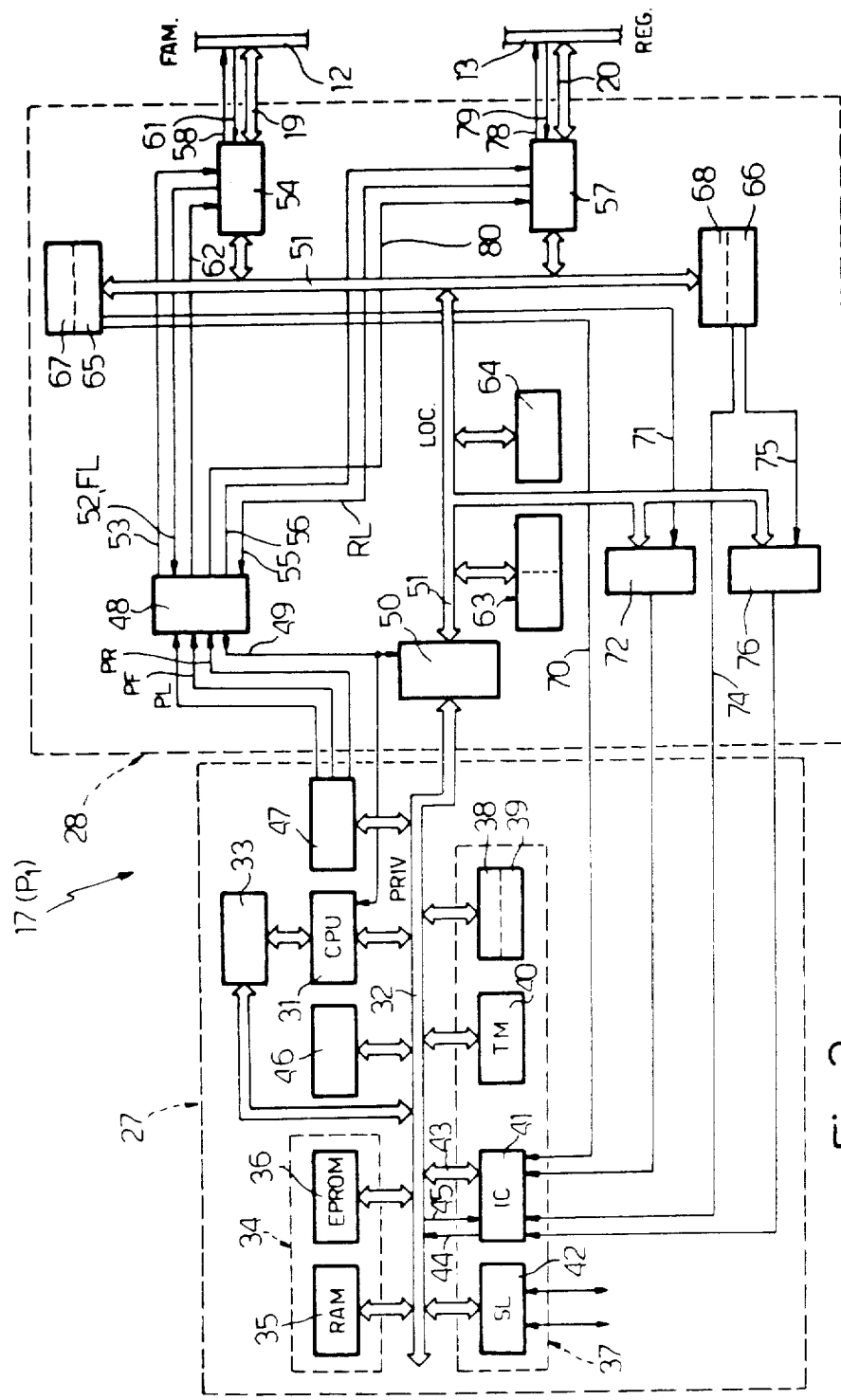
FIGS. 2, 3, 4 and 5 show more detailed block diagrams of component blocks on the FIG. 1 system.
Figure 7:
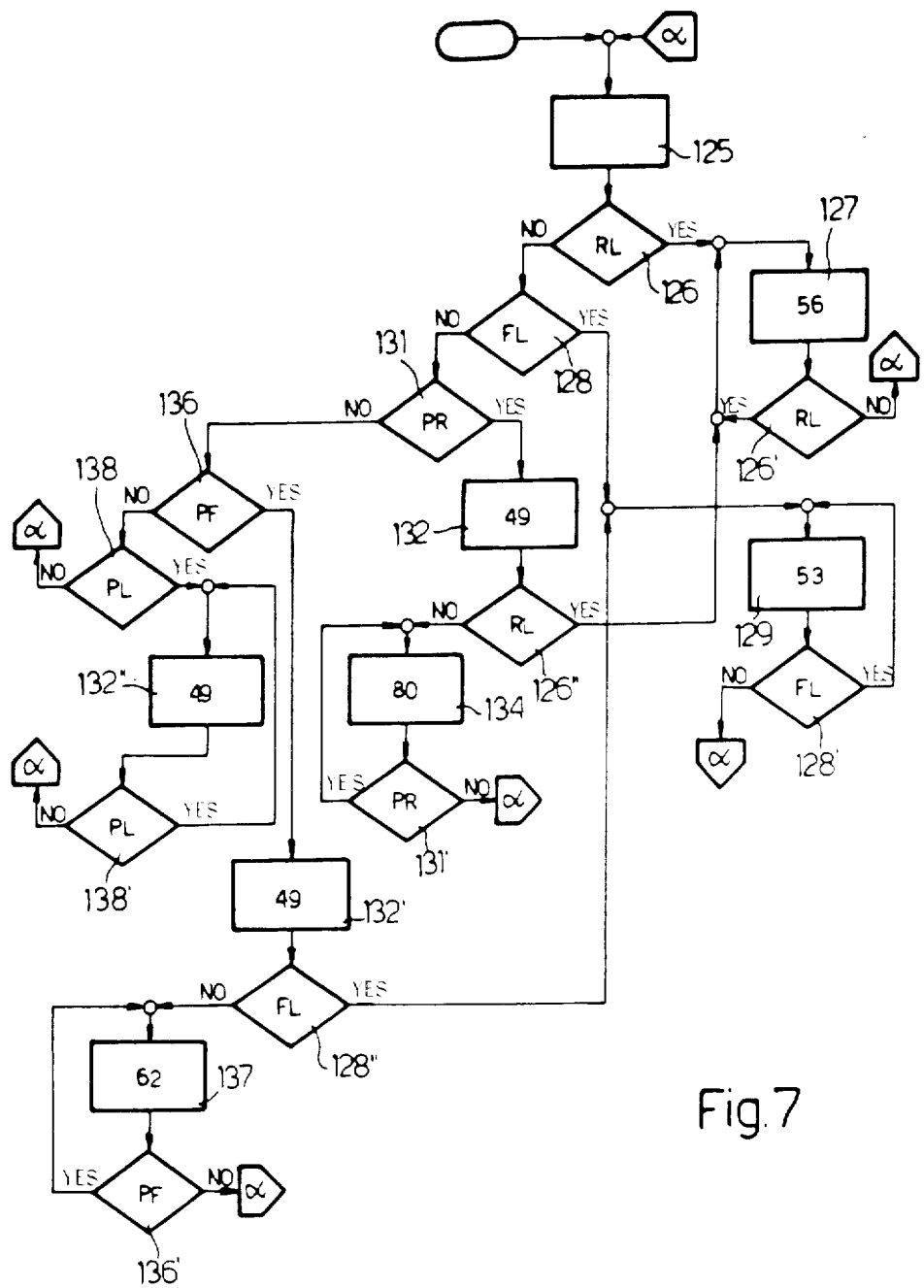
FIG. 7 shows an operating block diagram of an arbitration block in the FIG. 2 diagram.

Monoprocessor module 17 (P1) thus provides for linking the two (family and region) hierarchical levels and, as shown in FIG. 2, is divided into two blocks, 27 and 28, constituting a private and a local hierarchical level respectively. Block 27 comprises a processor 31 (CPU) consisting, for example, of an INTEL 80286 microprocessor supplied with 24 address bits and 16 data bits, and which is connected to private bus 32 supporting data, addresses and control signals. Processor 31 may be connected to a standard or special coprocessor 33 for accelerating its functions. Private bus 32 connects a private memory 34 consisting of a RAM block 35 and an EPROM block 36. RAM block 35 is only accessible by processor 31 and (if provided) coprocessor 33; is a static type with an access time requiring no waiting steps in the processor 31 cycle; is formed, for example, from 8 byte wide chips with a potential size of 256 Kb; and is supplied by a buffer battery in the event of power failure. EPROM block 36 provides for memorising the operating system, as well as initialization and diagnostic programs, and has a potential size of conveniently 128 Kb. Private bus 32 connects a private input-output area 37 comprising a private control register 38 (CRP), a private status register 39 (SRP), a timer block 40 (TM), an interrupt control block 41 (IC), and a serial line block 42 (SL). In addition to a group of lines 43 for exchanging data with private bus 32, interrupt control block 41 also presents a connection 44 for supplying interrupt signals to processor 31, and a connection 45 for receiving acknowledge signals from processor 31. Private bus 32 also connects a fault detecting block 46, and a global address decoding block 47 which receives the status and address data emitted by processor 31 and enables processor 31 to control memory and input/output area mapping as described in more detail later on. The block 47, in fact, generates one of three local, family or region level selecting signals, PL, PF, PR, which are sent to a local arbitration block 48 forming part of local block 28. The block 48, which operates as shown in FIG. 7 and as described in more detail later on, presents a first local access control line 49 for processor 31, which line 49 also goes to a block 50 for selectively separating private bus 32 from a local bus 51 also comprising data, address and control lines. Arbitration block 48 also presents an input connection 52 and output connection 53 exchanged with a block 54 interfacing family bus 12 and local bus 51, and an input connection 55 and output connection 56 exchanged with a block 57 interfacing region bus 13 and local bus 51. The said interface blocks 54 and 57 are also connected to respective buses 12 and 13 via respective connections 58 and 78 for requesting output connection to other modules, and via respective connections 61 and 79 for enabling connection to blocks 54 and 57. Blocks 54 and 57 are also connected to arbitration block 48 via respective connections 62 and 80.

To local bus 51 are connected:

a local memory block 63 divided into two sections, the first accessible by processor 31 and region bus 13, and the second accessible by processor 31 and family bus 12; the said block 63 comprising a static RAM memory, the access time of which, if the said RAM memory is assigned by processor 31, enables access to the same by processor 31 with no waiting steps in the processor cycles; which RAM memory is also supplied by a buffer battery;

a local input/output area comprising a local status register 64 (SRL), a family control register 65, a region control register 66, a family broadcast register 67 and a region broadcast register 68. Family control register 65 is connected to two inputs on interrupt control block 41 via a direct connection 70 and via a connection 71 on which is inserted a FIFO block 72 also connected to local bus 51. Region control register 66 is also connected to interrupt control block 41 via a direct connection 74 and via a connection 75 which goes to a FIFO block 76 also connected to local bus 51.

Figure 3:
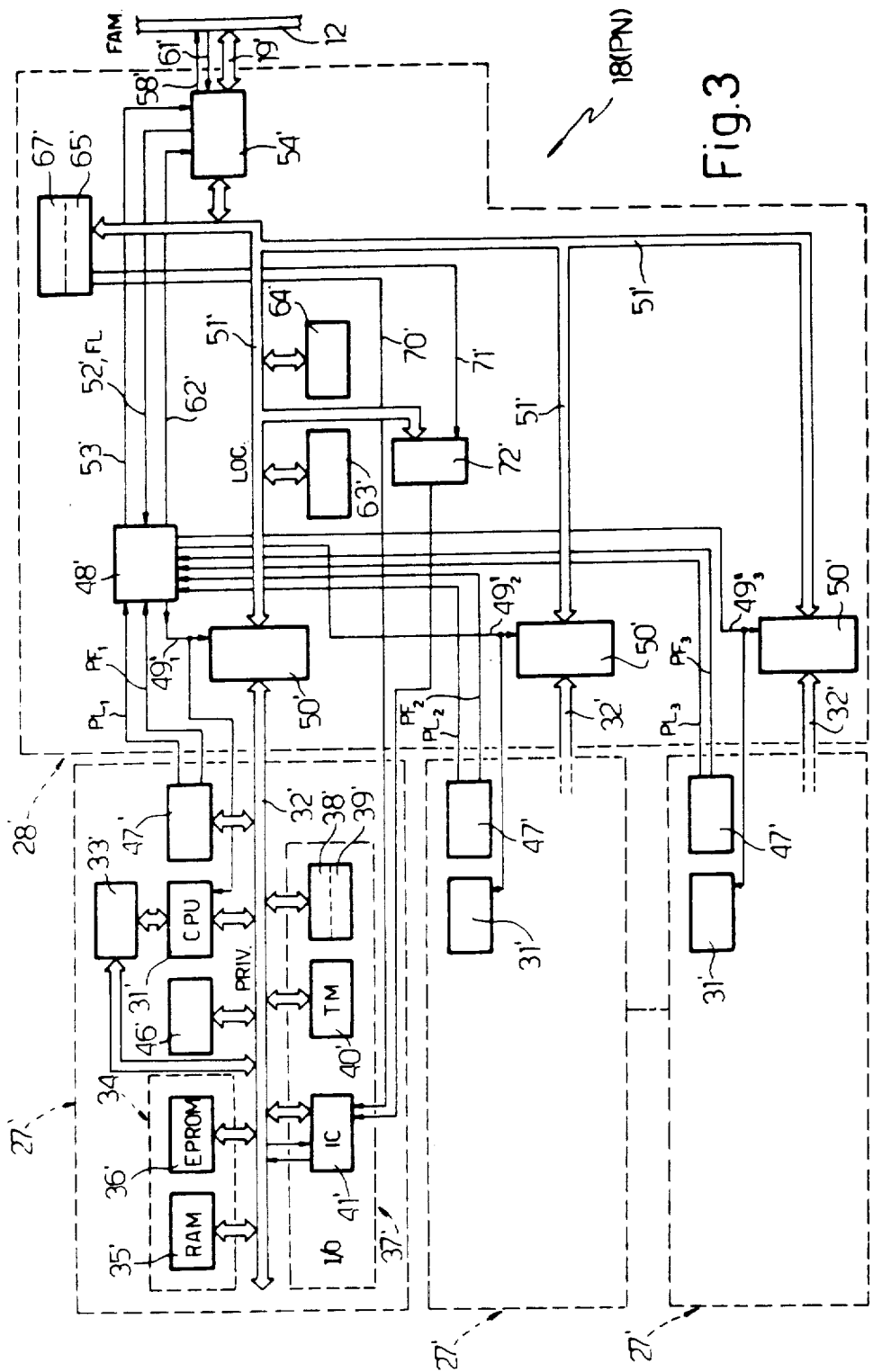

Multiprocessor module 18, shown in detail in FIG. 3, is the intensive processing module on the multiprocessor system according to the present invention, and comprises a number of private level processor blocks 27' similar to block 27 on monoprocessor module 17, the only difference being that there is no serial line block 42 in private input/output area 37'. As such, corresponding components are indicated using the same numbering system plus a '. The said module 18 also comprises a local level block 28' connected to blocks 27' and which provides for access solely via family bus 12. The said block 28' thus differs from block 28 on module 17 by having no interfacing components with region bus 13. Furthermore, blocks 50', which on one side receive private buses 32' from private blocks 27', are connected, on the other side, to the same local bus 51'. The blocks 50' (three in the example shown) therefore receive, from local arbitration block 48', a respective select signal $49'_1$, $49'_2$ or $49'_3$, which signals are also sent to respective processors 31' on blocks 27'. Address decoding block 47' on each private block 27' therefore sends only two signals, PL and PF, to local arbitration block 48', region address signal PR being omitted. As such, block 48' no longer exchanges signals 80, 55 and 56 with region interface block 57, which is omitted together with region registers 66 and 68. Local RAM memory block 63' presents the only area accessible by family bus 12.

Figure 6A:
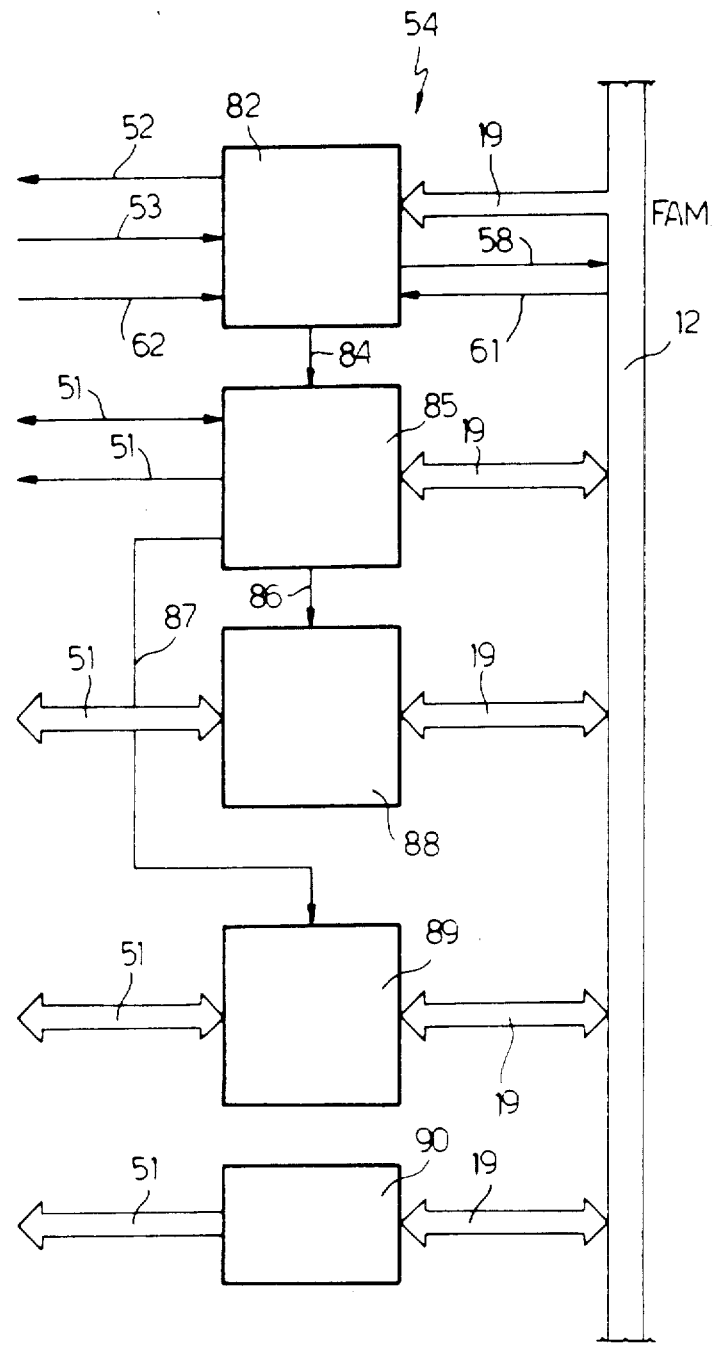
FIGS. 6A and 6B show more detailed block diagrams of blocks interfacing buses in FIGS. 2, 3 and 4.

Block 54 interfacing family bus 12 on monoprocessor module 17 is shown in detail in FIG. 6A, which shows a first logic block 82 exchanging lines 19, 58 and 61 with family bus 12, and lines 52, 53 and 62 with local arbitration block 48. The said block 82 supplies a cycle enabling signal 84 for a logic control block 85, which exchanges data lines 19 with family bus 12 and control signals with processor 31, and supplies interrupt signals to control block 41 via local bus 51. The said control block 85 supplies respective enabling signals 86 and 87 to a buffer memory block 88, which exchanges data between family bus 12 and local bus 51, and a buffer memory block 89 which exchanges addresses and statuses between family bus 12 and local bus 51. The block 54 also comprises a logic block 90 which exchanges error signals with family bus 12 and sends error signals onto local bus 51 for fault detecting block 46.

Figure 6B:
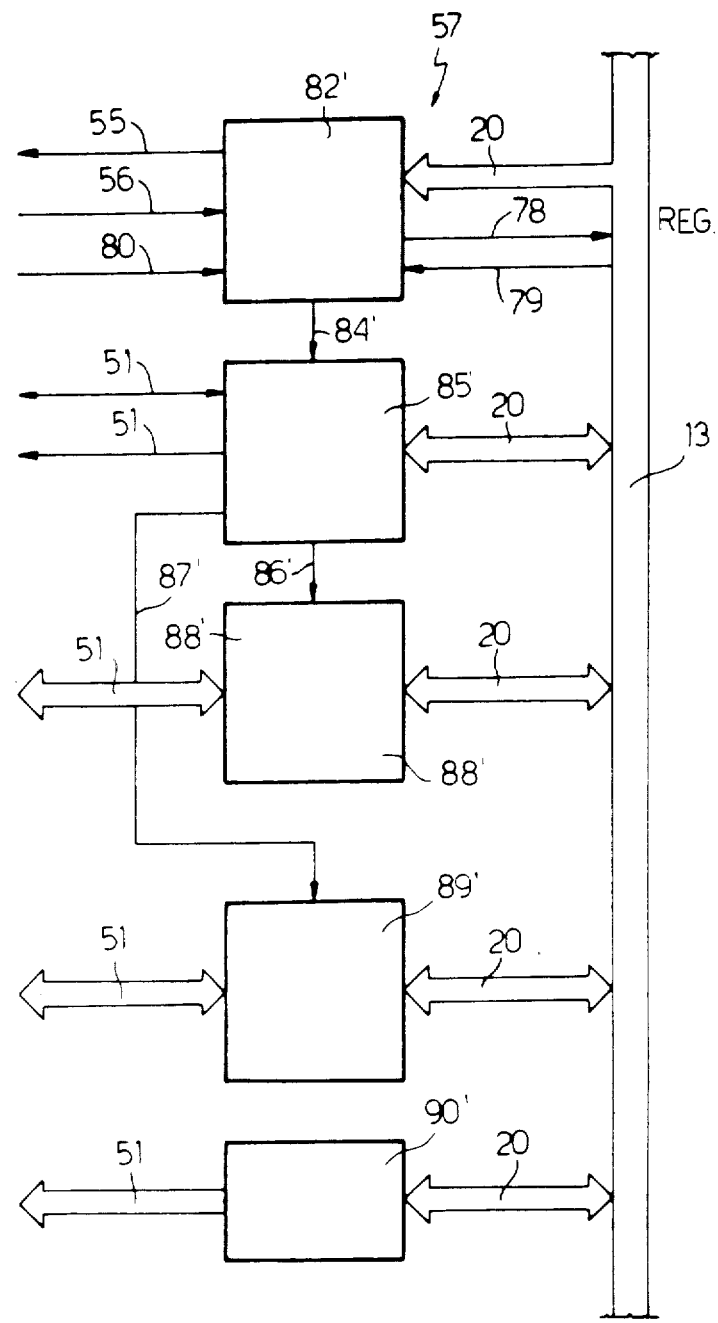

Block 57 interconnecting local bus 51 and region bus 13 on monoprocessor module 17 is shown in FIG. 6B, wherein components having the same functions as those on interconnecting block 54 in FIG. 6A are shown using the same numbering system plus a '.

The said interface blocks 54 and 57 are substantially the same as regards all the connections between the modules, including the processors, and respective family and region buses 12 and 13. As such, block 54' interfacing family bus 12 on multiprocessor module 18 is formed in the same way as block 54 in FIG. 6A.

Figure 4:
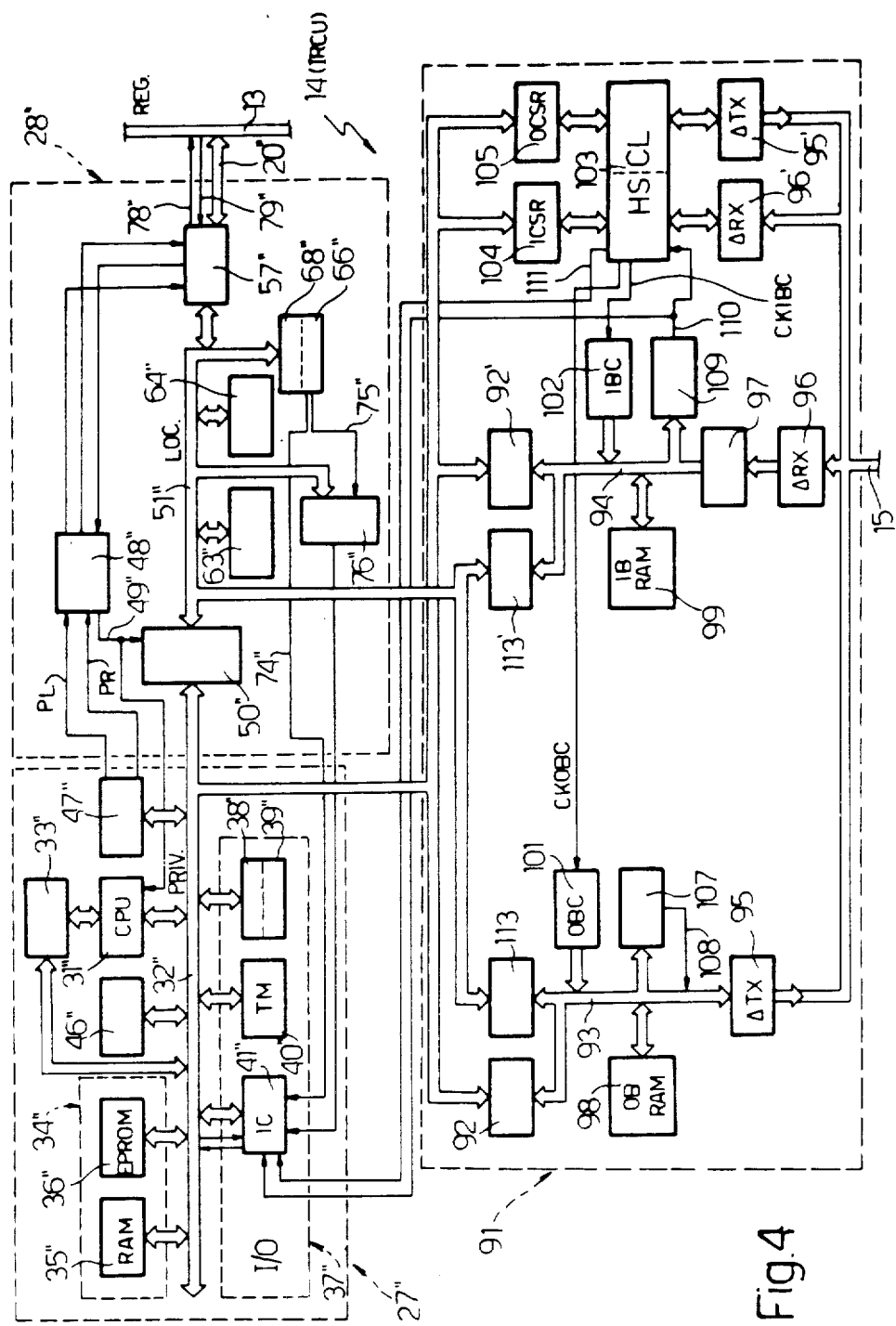

Unit 14 (IRCU) is a monoprocessor module connected to region bus 13. As shown in detail in FIG. 4, it presents a first block 27" similar to block 27 on monoprocessor module 17 and on which functionaly equivalent components are indicated using the same numbering system plus a ". The only difference between blocks 27" and 27 is that the former has no serial line block 42. The unit 14 also presents a block 28" similar to block 28 on monoprocessor module 17, from which it differs by having no interfacing components with family bus 12. Also lacking, therefore, are block 54, with the relative signals exchanged with local arbitration block 48", and registers 65 and 67 with the relative signals for interrupt control block 41". Block 57" interfacing region bus 13 is similar to block 57 in FIG. 6B, and local RAM memory 63" connected to local bus 51" presents only the part addressable by the region. Unit 14 also presents a block 91 for enabling communication with line 15. In more detail, private bus 32" may be connected, via disjunction blocks 92 and 92', to respective address and data buses 93 and 94, the first of which is connected to a TTL-differential signal converting block 95 for transmission to lines 15, and the second of which is connected to said lines 15 via a differential-TTL signal converting block 96 for external reception, series-connected to a pipeline block 97. Buses 93 and 94 respectively connect an output data RAM buffer block 98 (OB) and an input data RAM buffer block 99 (IB). The memory blocks 98 and 99 may conveniently be 8K in size with 32-bit locations and 32K expansion. The buses 93 and 94 are connected to respective logic address blocks 101 (OBC) and 102 (IBC) which receive respective signals CKOBC and CKIBC from a handshake and control logic block 103 (HSCL) comprising logic for controlling dialoguing both externally and with microprocessor 31" on block 27". The control block 103 is, in fact, connected to two registers 104 (ICSR) and 105 (OCSR) communicating with private bus 32". Logic block 103 is also connected to inter-region lines 15 via a converting block 95', similar to block 95, for signal transmission, and via a converting block 96', similar to block 96, for signal reception. Bus 93 is also connected to a block 107 for generating parity signals 108 supplied to bus 93 for transmission; whereas bus 94 is connected to a parity check block 109 having an output connection 110 which goes both directly to interrupt control block 41" and to logic dialogue control block 103 which, in turn, presents a connection 111 to said interrupt control block 41". Local bus 51" is also connected to buses 93 and 94 via respective disjunction blocks 113 and 113'.

As shown in FIG. 1, monitoring region 10' is connected to an external computer 16 via unit 14 (IRCU), in turn, connected to a TTL-differential signal converting unit 115 (TDC) connected to computer 16 via a single or two parallel-connected interface modules 116. The modules 116 may be standard DMA interfaces, e.g. DR11-W, in the case of a VAX11/750 external computer 16 connection.

The various region 13 and family 12 buses present roughly the same characteristics: they support master, slave, and master/slave modules, and carry 5 groups of signals (address and status, data, control, error, and arbitration). Both provide for 32-bit data transfer at a speed, in burst mode, of over 10 Megabytes/second. A 32-bit bus size enables the use of 32-bit processors 31, 31' and 31". Even when using 16-bit processors, however, the system according to the present invention presents characteristics, as described in more detail later on, for exploiting the bus size for speeding up data transfer. Furthermore, all the memories accessible by the buses are parallel-organized over 32 bits. The multiprocessor system according to the present invention therefore comprises, as described, a number of the regions 10 interconnected via high-speed parallel connections. As inter-regional communication is based on message exchange, the multiprocessor system according to the present invention may be defined, at this higher level, as a region network, the geometry of which may be defined as required for best catering for a given application. Furthermore, by connecting monitoring region 10' to external computer 16, the entire system benefits from the programs and peripheral devices of ready-made commercial machines. Each region 10 therefore consists of a number of the families 11, and shares a common memory address space and a common bus 13. To be more precise (FIG. 11a), a common region address space of 7 Megabytes may be divided into subspaces assigned to memory blocks or processing modules connected to the region bus 13. These processing units have access to reciprocal memory subspaces via region bus 13, but do not engage the region bus for gaining access to their own subspaces, by virtue of providing for local bus 51 (FIG. 2).

The structure of each family 11 is fairly similar to that of region 10: a family 11 consists of a group of processing modules sharing a common memory address space and a common bus 12. As in the case of region 10, a family memory space (FIG. 11a) of 8 Megabytes is divided into local (though not private) subspaces for the various processor modules, which are allowed access to reciprocal memory spaces via family bus 12 and to their local memory via internal local bus 51'. Each region 10 is allowed visibility of a common address space of 16 Megabytes, divided as shown in FIG. 11a, whereas the input and output address space is 64 K bytes, divided as shown in FIG. 11b.

As already stated, the multiprocessor system according to the present invention operates at five hierarchical levels (three main and two sublevels) which are "nested" starting from elementary processing unit 31, 31' or 31", up to the system consisting of multiprocessor networks, i.e. regions 10. The hierarchical levels, which depend on the extent to which common resources can be shared (memories and inputs/outputs affording direct access by all the modules connected to the same bus), are: private, local, family, region and region network. A closer examination of the first four shows that:

(a) The private hierarchical level is the innermost level on the system processor. Typically, it consists of an independent processor 31, 31' or 31", a private memory 34, 34', 34" dedicated exclusively to processor 31, 31' or 31", and a group of private input/output resources 37, 37', 37".

(b) The local hierarchical level enables each processor 31, 31', 31" on the system (whether they be a few or a few thousand) to gain access to its own local memory 63, 63', 63" (physically on the same module containing the processor), and to a group of local resources containing the various registers. On multiprocessor module 18, there exist n private environments, as defined by blocks 27', communicating at local level as defined by block 28'.

(c) The family hierarchical level consists of a group of processing, input/output and memory modules sharing a common memory space of 8 Megabytes and communicating via family bus 12. Processor modules 17 and 18 each have access to local memory 63 and 63' on the other processing modules in the system, as well as to common resources such as high-capacity memory block 22 and input/output block 23.

(d) The region hierarchical level consists of a group of families 11 sharing a memory space of 7 Megabytes (different from the family space). As in the case of the family hierarchical level, the memory space may be divided into subspaces assignable to processor modules which, in this case also, have access to local memory 63, 63" on the other units via region bus 13, but do not occupy the bus for each gaining access to its own local memory.

These four hierarchical levels combine to form the multiprocessor section of the system according to the present invention, which is therefore characterized by "visibility" or direct "access" by cooperating processor modules of/to a given physical address space. The section in itself constitutes an extremely powerful system capable of controlling, in real time, a combination consisting, for example, of 32 families 11, each family 11 consisting of 125 processors 31 and 31'. Total power in terms of MIPS (million instructions/second) for each region 10 ranges from 4,000 to 8,000 (depending on the application and the extent to which algorithmic accelerating devices, such as coprocessor 33, are employed). Such computing power places the system according to the present invention in an advanced application range. The total computing power of the region 10 network system may therefore range from as many as 40,000 to 80,000 MIPS, which is far superior to anything as yet achieved by known systems. For ensuring "transparent", "intelligent"and "fully independent" operation of network-connected regions 10, and handling the required data exchange load, the system according to the present invention is based on special hardware features supported on dedicated software procedures. Operation of the modules and blocks on the present system will now be described in detail.

As already stated, the first four hierarchical levels are characterized by "direct visibility" of a physical address space by the various processing units on the system. The space consists of two partitions, one of 16 MEGA-BYTES reserved for the memory (FIG. 11a) and the other of 64K BYTES reserved for input/output devices (FIG. 11b). Both are divided into three main areas:

Private area: dedicated to a single processor 31, 31', 31";

Family area: combining the local resources of the processors assigned to one family;

Region area: combining the local resources of the processors assigned to one region.

The private hierarchical level is the innermost level of the processor modules on the system. It is fully independent in relation to the others and strictly dedicated to the processor on the physical module, which may employ private resources regardless of the status of more outer hierarchical levels. The resources are such as to ensure a high degree of efficiency and effective interaction with the other levels. As already stated, monoprocessor module 17 (P1) is connected to both family 12 and region 13 buses. For each family 11, provision is made for only one monoprocessor module 17 (P1) which presents private memory 34 and input/output (I/O) 37 areas accessible only by processor 31 on module 17, and a local area on block 28 accessible also by processors 31, 31' and 31" on other modules 18 on family bus 12, or modules 17 or 14 on region bus 13. Processor 31 on module 17 (P1) is therefore allowed visibility of local memories 63 or 63" (and the local I/O area) of the other modules on region bus 13, and local memories 63' (and the local I/O area) of family-resident multiprocessor modules 18.

Module 17 (P1) (like modules 18 (PN) and 14 (IRCU)) is therefore a MASTER-SLAVE module, i.e. capable of emitting addresses, controls and data (when processor 31 is intent on accessing an internal or external memory or I/O area) as well as receiving addresses, controls and data (when another module is intent on accessing the local area of P1).

Private control register 38 is an 8-bit register, structured as shown in FIG. 9a, which permits processor 31 to control a number of special private level functions, such as performing test cycles (TSC) and enabling unmaskable interrupts (ENMI). Other functions controlled by register 38 provide for communicating to higher levels the operating status of the module (ONLN) and module faults (FLTF), as well as for "Master Clear" control at family level (MCLF). A system may also be activated for high-efficiency data exchange between local memory 63 on module 17 (P1) and that of the slave module involved (DW), as described in more detail later on. Finally, two bits (STOPF and STOPR) provide for maintaining a reasonable interrupt response time between family or region processors, by enabling only one processor at a time to retain exclusive possession of the respective family 12 or region 13 bus for a number of cycles, according to a characteristic of the prsent invention described in more detail later on. Private status register 39 is an 8-bit register, structured as shown in FIG. 9b, for enabling reading of a number of flags (ENMI, DW) adjustable by control register 38, and other error flags. RAVL and FAVL flags respectively indicate the availability of region bus 13 or family bus 12, which condition holds true if at least one module on the bus asserts its availability as indicated by a deactivated ERF flag and an activated ONLN flag. The ERF flag indicates an operating fault and, when activated, forces processor 31 to operate exclusively at private level, thus isolating the faulty module from the rest of the system, and causes respective interrupt signals (FFRL and RFLR) to be sent to all the family and region level modules. The HOTST flag indicates restarting of the system subsequent to supply failure and, when activated, prevents access to private memory 34 or local memory 63. The SLVE flag indicates a master-slave dialogue error as asserted by logic circuits on the slave module subsequent to an unmaskable interrupt on the master module. The TOUT flag indicates a time runout caused by the processor addressing a non-existent slave and, when activated, causes an unmaskable interrupt on the processor.

Interrupt control block 41 enables processor 31 to control a number of interrupt lines by assigning appropriate priority. Interrupts may be divided into three groups:

from private level;

from family level (via connections 70 and 71);

from region level (via connections 74 and 75).

Timing block 40 comprises a number of timers for generating the baud rate for serial line 42 and private level interrupt signals, and for controlling a number of intermodule communication situations as described in more detail later on.

Global address decoding block 47, controlled by processor 31, provides for generating directly, on private bus 32, the select controls relative to private memory area 34 and I/O area 37. It also generates a request for access to local memory 63 and I/O blocks on the module itself, as well as to the memory and I/O blocks on other modules on the family and region buses to which P1 is connected. The requests, PL, PF, PR, are examined and serviced by local arbitration block 48.

The private level thus provides for interaction with higher levels via global decoding block 47 and interrupt control block 41, for exchanging data and/or transmitting or receiving interrupts with other blocks at said levels.

The local hierarchical level allows each processor 31, 32', 31" on the system access to its own local memory 63, 63', 63", and to a group of local I/O resources contained in block 28, 28', 28" and physically located on the same module containing the processor, or to the local memory and local I/O resources of each of the other processors at a higher level (family or region) and connected to the same bus.

The local hierarchical level is independent of the higher levels (at single physical module level) while at the same time providing for effective cooperation with higher levels, by virtue of its dedicated hardware resources. The local level will now be described in more detail with reference once again to its implementation on module 17 (P1) (FIG. 2). The same also applies to modules 18 and 14, with obvious adaptions for the respective parts omitted for access to region bus 13 and family bus 12.

Of the memory on module 17 (P1), local memory 63 is the part accessible by processor 31, family bus 12 and region bus 13, and thus constitutes a resource shared by these agents.

For data exchange between local memories 63, 63', 63" on different modules (as described in more detail later on), provision has been made for 32-bit parallel data transfer, with both 32-bit and 16-bit array visibility of the memory.

Local arbitration block 48 is implemented by a status machine, which examines the request for access to local bus 51 by the three agents (processor 31, region bus 13 and family bus 12).

To avoid a deadlock, the algorithm employed assigns greater priority to requests from the two buses. Each request from any one of the three agents may retain exclusive control of local bus 51 for a number of successive cycles. FIG. 7 shows an operating diagram of the status machine.

Upon performance of a cycle, arbitration block 48 is kept on wait by block 125. Upon arrival of an access request signal, block 125 goes to block 126 which determines whether it is the RL signal on connection 55 (region request). In the event of a positive response, block 126 goes to block 127 which, via connection 56, controls, via interface 57, direct access of region bus 13 to local bus 51. Block 127 then goes on to block 126' similar to block 126 and which, if request signal RL is still present, keeps block 127 activated, and, if not, goes back to wait block 125. In the event of a negative response, however, in block 126, this goes to block 128 which determines whether the request is due to the FL signal on connection 52 (family request). In the event of a positive response, block 128 goes to block 129 which, via connection 53, controls, via interface 54, direct access of family bus 12 to local bus 51. Block 129 then goes on to block 128' similar to block 128 and which, if request signal FL is still present, keeps block 129 activated, and, if not, goes back to wait block 125. In the event of a negative response, however, in block 128, this goes to block 131 which determines whether the request is for region access by processor 31 (PR signal). In the event of a positive resonse, block 131 goes to block 132 which, via connection 49, controls, via interface 50, direct access of processor 31 to local bus 51, and then goes on to block 126" (similar to block 126) which determines whether a priority access request exists from region bus 13. In the event of a positive response, block 126" goes back to block 127 for performing the priority connection (and disjunction of interface 50), whereas, in the event of a negative response, block 126" goes to block 134 which, via connection 80 controls, via interface 57, direct access of processor 31 to region bus 13. Block 134 goes on to block 131' similar to block 131 and which, if the PR signal is maintained, keeps block 134 activated, and, if not, goes back to wait block 125. In the event of a negative response, however, in block 131, this goes to block 136 which determines whether the request is for family access by processor 31 (PF signal). In the event of a positive response, block 136 goes to block 132' (similar to block 132) which controls direct access of processor 31 to local bus 51, and then goes on to block 128" (similar to block 128) which determines whether a priority access request exists from family bus 12. In the event of a positive response, block 128" goes back to block 129 for performing the priority connection (and disjunction of interface 50), whereas, in the event of a negative response, block 128" goes on to block 137 which, via connection 62, controls, via interface 54, direct access of processor 31 to family bus 12. Block 137 goes on to block 136' (similar to block 136) which, if the PF signal is maintained, keeps block 137 activated, and, if not, goes back to wait block 125. In the event of a negative response, however, in block 136, this goes on to block 138 which determines whether the request is for access to local bus 51 by processor 31 (PL signal). In the event of a positive response, block 138 goes on to block 132" (similar to block 132) which controls the direct access and then goes on to block 138' (similar to block 138) which, if the PL signal is maintained, keeps block 132" activated, and, if not, goes back to wait block 125. In the case of module 18, for example, with three private blocks 27' (FIG. 3), signals $49'_1$, $49'_2$ or $49'_3$ are emitted respectively for requests $PL_1$ or $PF_1$, $PL_2$ or $PF_2$, $PL_3$ or $PF_3$. Local status register 64 is a 16-bit register, structured as shown in FIG. 9c and readable on local bus 51 in the I/O space. It contains information concerning the type of module and the status of a number of operating status flags (errors, lines on/off) on the module itself. The functions of flags ERF, ONLN and FLTF are the same as on private control register 38 and private status register 39. The TYPE flags identify the type of module, whereas the LREG flag enables processor 31 to distinguish its own local status register 64 from that of the other modules. Family control register 65 is a 16-bit write-only register connected to the I/O space on local bus 51 and structured as shown in FIG. 9d, for enabling interrupts to be sent to processor 31 by other processors in the family. The interrupts are of two types:

vectored (INTFIFO) on connection 71;

non-vectored (INTPR0, INTPR1, INTPR2) on connection 70.

The type of interrupt is specified by bits F0, F1 and F2. Vectored interrupts use bits V0, V1, V2 and V3 for associating the vector. Vectors are queued in FIFO block 72 from which they are extracted successively by processor 31. Region control register 66 is functionally identical to family register 65, and is visible by region processors. The system according to the present invention provides for "broadcast" transfers, i.e. transfers piloted by a processor which transfers data simultaneously from its own local memory to those of a number of receiving processors.

Receiving processors are organized in clusters, and each processor may belong to up to eight clusters at the same time.

A broadcast transmission is performed by the transmitting processor addressing one of the eight memory areas reserved for this type of transfer. The areas are all 64 Kb in size (FIG. 11a) and mapped in the highest family and region space addresses. Each cluster is assigned a bit (CL 0-7) in the broadcast register, which is thus of 8-bit size and structured as shown in FIG. 9e. Assignment to the Nth cluster therefore depends on the logic value assigned to the Nth bit on the broadcast register.

Provision is also made for broadcast writing the control registers, for enabling interrupts to be sent simultaneously to a number of processors and so, for example, commencing simultaneous processing of a number of cooperating processes.

Module 17 (P1) presents a region level broadcast register 68 and a family level broadcast register 67.

As already seen in FIG. 6A, block 54 interfacing family bus 12 consists of hardware devices enabling one module (e.g. 17 (P1)) to control access to the local memory and I/O area of the other modules connected to family bus 12, the modules also being allowed access to the local memory and I/O on module P1 (family map). Family interface 54 supports five groups of signals (address and status, data, control, error, arbitration). Arbitration between modules is performed using what is known as the "snapshot" technique, which will be described in more detail later on. As already seen in FIG. 6B, block 57 interfacing region bus 13 is functionally similar to family block 54.

Interaction between local and higher levels is therefore affected mainly via:

family bus interface 54 or region bus interface 57;
broadcast registers 67 or 68;
status registers 64;
control registers 65 or 66 and relative interrupt structures. Interfaces 54 and 57 allow modules connected to higher levels access to local level and vice versa.

Broadcast registers 67 and 68 provide for cluster formation and supplying simultaneous interrupts to clusterassigned processors.

Status registers 64 inform higher levels of the characteristics and status of the module.

Control registers 65 and 66 enable interrupts to be sent between same-level processors.

As already stated, the family hierarchical level is the intensive data processing level on the system, within which cooperate the most powerful computing elements on the system, and I/O modules 23 for communicating to and from the application.

Cooperation between family processors is affected via a common family bus 12.

"Effective cooperation" between the processors at one level and between this and lower (local) and higher (region and region network) levels may best be explained with reference to the address structure (FIGS. 11a and b) which assigns to the family a memory space of 8 Mb and an I/O space of 16 Kb. To these spaces are allocated all the local resouces of each module in a given family.

The module blocks already described constitute the means and environments enabling interaction with the family level via local bus 51. In particular, global decoder 47 (and 47′) permits access by each master module on the family bus to its own local memory and I/O, as well as to the local memories and I/O of all the other modules on the same bus 12.

Local arbitration block 48 (and 48′) receives all the requests for access to local resources, including the request from the family, and provides for making the resources available in a sequence depending on the internal states of each module.

Local memory 63 (and 63′) is the "physical" communication element between the two (local and family) levels.

Family control register 65 (and 65′) is used for supporting the in-coming family interrupt structure.

Family broadcast register 67 (and 67′) provides for assigning a memory area to one of eight possible broadcast clusters.

Local status register 64 (and 64′) supplies information concerning the status of a single module in relation to its family.

Family bus interface 54 (and 54′) supplies, at the local level of each module, access requests from master modules on family bus 12.

As already seen in connection with the family level, a region consists of a group of modules sharing an address space and a common bus.

In this case also, the modules are highly independent in terms of processing, while at the same time providing for highly efficient cooperation with other modules in the same region.

In the case of inter-level cooperation, the above characteristics are maintained by employing the same dedicated functions employed at family level on each physical module within the region. The functions constitute interacting means and environments (global decoder 47 (and 47″), local memory 63 (and 63″), region control register 66 (and 66″), broadcast register 68 (and 68″), local status register 64 (and 64″), local arbitration block 48 (and 48″), and region bus interface 57 (and 57″)).

Figure 5:
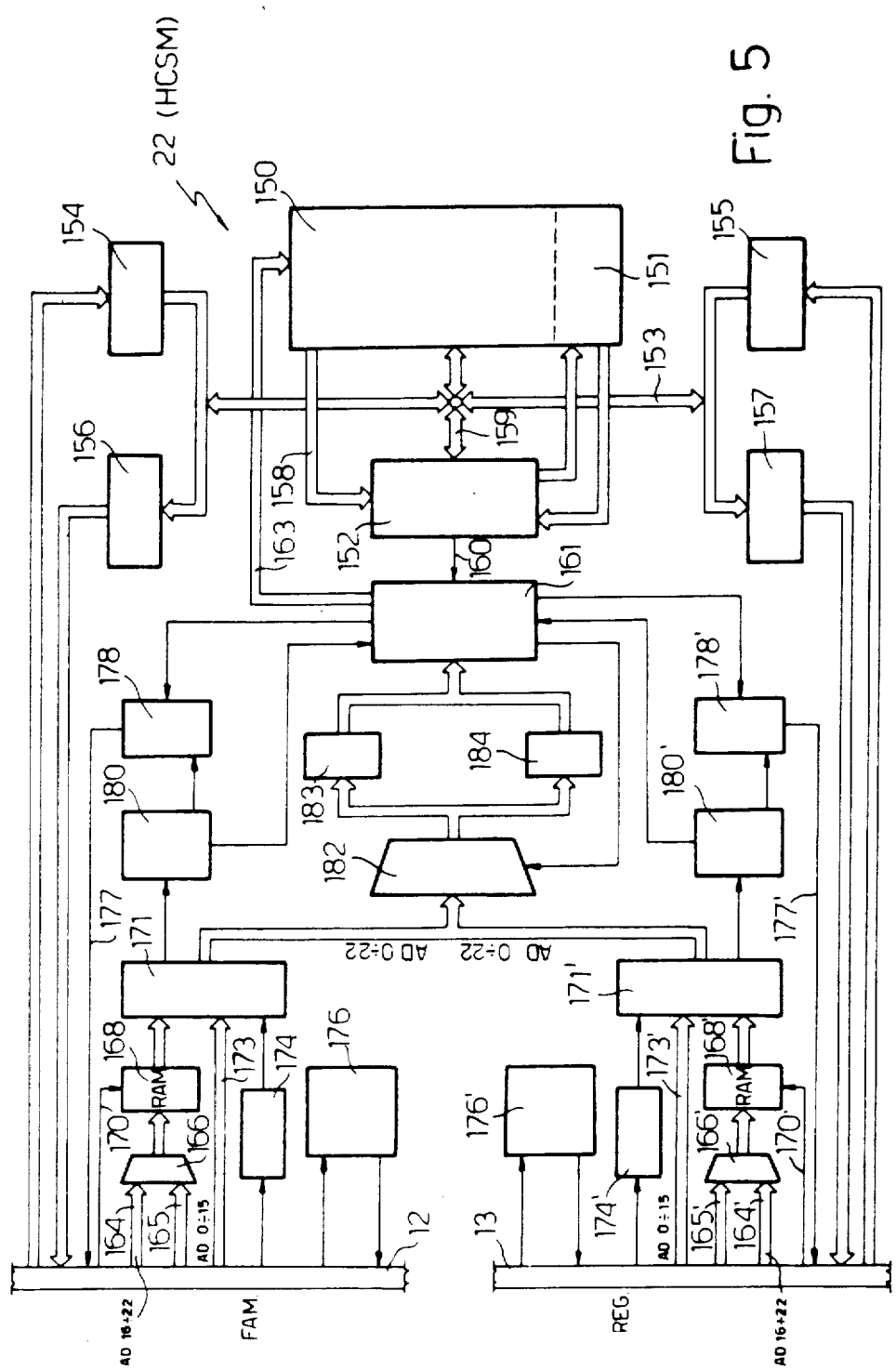

The "local" functions of the various region modules are accessible via region bus 13. In particular, cooperation between the family and region levels is supported by modules 17 (P1) and 22 (HCSM). Module P1 is allowed visibility of both the address space of its own family (1 P1 per family) and the region address space to which may be connected a number of families (conveniently 32, for example). P1 also avails itself of the two high-capacity family 12 and region 13 buses and all the hardware characteristics already described. Block 22 is designed for high-efficiency exchange of large amounts of data between the two environments (family and region). In fact, in addition to having a very high storage capacity, it also has a double port connected to both family 12 and region 13 buses, thus enabling data available in one environment to be made simultaneously available in the other, with the big advantage of not having to go through the system bus, as described in more detail later on with reference to FIG. 5. Memory block 22 (HCSM) presents a memory array 150 with a section 151 for control bits exchanged with a logic error detecting and correction block 152. The read or write data in memory 150 goes to lines 153 (conveniently 32-bit) connected to two write data registers 154 and 155, respectively connected to family bus 12 and region bus 13, and to two read data registers 156 and 157 also connected respectively to family bus 12 and region bus 13. The data exchanged with memory 150 also goes, via lines 158, to logic block 152, which is also connected, via a read or write control line 159, to line 153, and, via an error signal line 160, to a block 161 for arbitrating requests, controlling the double (family-region) port and timing the control signals of memory 150. The block 161 supplies memory 150 with address signals 163 (RAS/CAS/ADDRESS).

Family bus 12 is connected:

to two inputs on a multiplexer 166, via two lines, 164 and 165, respectively supplying address bits 16 to 22 or another 7 bits; the output of multiplexer 166 going to a RAM memory block 168 for mapping the family addresses, which block 168 receives a (write) control signal 170 from family bus 12, and the output of which goes to a family bus address and status latch 171;

to the latch 171 via direct lines 173 supplying address bits 0 to 15;

to a family bus 12 control receiving block 174 which supplies a signal to latch 171;

to the inputs and outputs of a family status and control register 176;

and receives a signal 177 from a logic block 178 for data exchange acknowledgment and information.

Region bus 13 is also connected in the same manner to functionally equivalent blocks indicated using the same numbers plus a '.

The status output of latch 171 goes to a status decoding and cycle request generating block 180 connected to block 178 and block 161. The status output of latch 171' is connected in the same manner.

The address outputs (bits 0 to 22) of latches 171 and 171' go to the inputs of a multiplexer 182 controlled by block 161 and the output of which goes directly (via only conjunction or disjunction block 183) or via pipeline 184, to the address input of arbitration block 161 which also controls logic blocks 178 and 178'.

By way of example, the maximum capacity of memory block 22 is 8 Mbytes, divided into 128 segments of 64 Kbytes each. The memory 22 is visible by both family bus 12 and region bus 13, and, as memory capacity is greater than the address space available for each bus, the present invention provides for a mapping mechanism enabling both buses to exceed the physical 8 Mbyte limit.

The memory is organized on a 32-bit word length (double word) and permits 32-bit (double word), 16-bit (word) and 8-bit (byte) read and write access.

The two (family and region) memory access ports present two identical, independent mapping systems. The logic of the systems provides for dividing the 8 Mbyte total into 128 segments of 64 Kbytes each, each of which segments may be shifted to any point within the physical address space (within 64K limits). A physical address is assigned to a given segment by writing the segment number into the mapping register of the relative address. The mapping registers are grouped into 128-word RAM memory block 168 and 168'. In normal read and write cycles of memory array 150, the address from the family and region bus is composed of two parts:

bits 0 to 15 are sent directly to memory array 150 via connection 173 or 173' which goes directly to latch 171 or 171';

bits 16 to 22 are used for extracting from mapping RAM 168 or 168' the (7-bit) segment number assigned to the address. These 7 bits are the most significant bits in the memory array 150 address. Consequently, by modifying the 7 bits in mapping RAM 168 or 168' (via lines 165 or 165'), the same address from the family or region bus may be used for enabling access to different segments and, therefore, different areas of memory array 150. Address bit 23 is set to zero on region bus 13, and to one on family bus 12, and is not employed by mapping logic.

Mapping register 168 or 168' also contains:

1 bit for defining a "read/write" or "read-only" segment;

1 bit for determining whether an HCSM memory segment exists at that particular address. For example, the addresses corresponding to the first 128 Kbytes on family bus 12 will obviously be assigned to HCSM memory segments, in that the addresses are assigned to local memory 63 on module 17 (P1) (FIG. 11a);

1 parity check bit generated and controlled directly on the module.

The mapping mechanism in the present invention provides for installing a number of memories 22 (HCSM) on the same region or family bus, as well as for enabling exclusive visibility of the memories by the region or the family. Furthermore, a segment shift involves no data transfer, simply the modification of a mapping register on block 168 or 168'.

The memory 22 control program initializes and modifies the family and region mapping RAMs 168 and 168' by obtaining access to a specific (switch-selectable) portion of the family and region I/O space.

Control registers 176 and 176' are provided with a bit for preventing access to memory 22 until the control program has initialized mapping RAMS 168 and 168'.

As the memory block 22 (HCSM) is designed for interfacing with the buses on the system according to the present invention, it must take into account specific characteristics of the buses, such as, pipeline address generation, 8-, 16-, 32-bit data transfer, and the possibility of discontinuous or locked access. To this must also be added the fact that memory 22 is a double-port type, which means provision must be made for controlling the conflicting priority of fully asynchronous in-coming requests from region bus 13 and family bus 12.

The temporary address storage problem is overcome by storing the addresses in latches 171 and 171'. Status (e.g. DOUBLE WORD) signal decoding supplies dynamic memory control block 161 with information concerning the type of cycle requested. The same block 161 also provides for request synchronization and arbitration, as well as for ensuring "locked" data transfer. For improving write cycle access time, two registers 154 and 155 (one for each bus) have been provided for accommodating input data and so terminating the bus cycle in as short a time as possible. Random read cycles are penalized by the access time of dynamic memory 150, to which must be added the delay introduced by logic error detecting and correcting block 152, and request synchronization time.

Performance is consideraly improved in the case of sequential and locked access, whereby the address of the memory location to be requested in the next cycle may be "forecast" and pipelining logic activated for withdrawing the data item in advance and so ensuring it is made immediately available when requested by the master. In this case also, the bus is engaged for a minimum length of time.

Such performance applies to all types of read operations: double word, word and byte.

The data item withdrawn from memory 150 is, in any case, accommodated in two separate registers 156 and 157 (one for each bus), for preventing possible interference between cycles activated by different buses.

Memory array 150 is parallel-organized over 32 bits for fully exploiting the transfer capacity of the system according to the present invention.

To the 32 data bits are added 7 error check bits. Using 256 Kbyte chips, this gives a total of eight 1 Mbyte memory banks, each with a total of 312 memory chips. 32-bit parallel organization also enables a certain amount of saving in the number of error check chips, with no impairment in the 16- or 8-bit reading performance of the system. As memory matrix 150 is formed from dynamic components, which are more susceptible to "soft" errors, the logic of module 22 (HCSM) provides for single bit error correction, and error detection over two or more bits. The CSM module may also be formed in 6, 4, 2 Mbytes, with or without error detection and correction via block 152. The top hierarchical level of the system according to the present invention is the "region network." This is characterized by the fact that the various regions 10 of which the system is composed (eight in the demonstration embodiment) are not allowed direct visibility of their own address space, but communicate by messages via interconnecting units 14 interconnected by lines 15. By virtue of hardware characteristics described in more detail later on, the units 14 guarantee mutual access "transparency" of the various "multiprocessor regions" on the network, transfer "intelligence", respective message reception and processing, "fully independent" operation of each region, and, finally, data "throughput" as required for ensuring efficient transfer of large-size, high-speed data messages. As already stated, the unit 14 is a monoprocessor module connected to region bus 13, communication via units 14 being performed by means of messages enabling the following functions:

(1) Inter-process communication in both environments.

(2) Employment of peripherals on an external computer or in another region.

Interconnection of units 14 is based electrically on a differential protocol, e.g. RS-422, is conveniently parallel-organized over 32 bits, and provides for transmission speeds of up to 13.5 Mbytes/second and a physical distance between connected units 14 of over 100 m. A reception parity check (1 bit per 16-bit word) and message check guarantee the reliability of the connection.

Address space control on the unit 14 is identical to that of a P1 module as regards the region. In fact, FIGS. 11c and d relative to memory and I/O space correspond with FIGS. 11a and b halved respectively to 8 Mbytes and 32 Kbytes. Also identical to module 17 (P1) are: control register 38", private status register 39", region registers 66" and 64", and the control flags. The interrupt structure is also substantially the same as on module 17 (P1), except that, in this case, the family interrupts are omitted and provision made for interrupts relative to communication between two regions (or host and region).

Signals sent out (or received) by unit 14 are TTL-differential-converted (or vice versa) using differential receivers 96 and 96' and transmitters 95 and 95', which convert 5 bits per chip.

Prior to TTL/differential conversion, each 32-bit data item transmitted is assigned 2 parity bits (1 per 16 bits) by block 107. Subsequent to conversion of the in-coming data item, a parity check is performed by block 109. In the event of an error being detected during reception, error interrupts are sent to both sides of the connection via connection 110 and block 103. Register 97 downstream from differential receiver 96 provides for two functions: enabling a parity check of a stable data item, and anticipating the acknowledge response as compared with direct buffer writing (pipeline).

Buffers 98 and 99 are treated by processor 31" as two private I/O ports and, as such, are inaccessible by region bus 13. Access to buffers 98 and 99 is strictly sequential, the buffers being addressed by two 16-bit pointers (102 (IBC) and 101 (OBC)) which block 103 (HSCL) increments via signal CKIBC or decrements via signal CKOBC each time the relative port (IB/OB) is accessed. Processor 31" may read and reset the values of pointers 101 and 102, and preset pointer 101 (OBC) to any value. Location 0 on buffer 99 (IB) is filled externally with a TCW (Transmission Control Word containing useful transmission information, as described in more detail later on), after which, the buffer is self-incremented up to location n containing the nth data item, and subsequently emptied by the processor in the same order (after first resetting pointer 102 (IBC). Buffer 98 (OB) is filled by processor 31" starting with location 0 (previously reset) into which is written the nth data item. Location 1 is then filled with the (n−1)th data item, and so on up to location n−1 into which is written the first data item on the buffer. This operation is performed by withdrawing data from local memory 63" by means of "reverse" addressing as provided for by processor 31". The TCW is then written in location n of buffer 98 (OB). The content of buffer 98 is transferred to the connected unit 14 by decrementing pointer 101 (OBC) at each access, so that data is received in the correct order by block 99 (IB) on the connected unit 14.

The logic of handshake block 103 provides for relieving processor 31" of inter-regional transmission and reception control. The logic controls the handshake signals with external line 15 and processor 31", so as to ensure:

(1) A very short response time.

(2) Minimum interference with the activity of processor 31" which is only called upon to perform the START control and receive the end and any error signals.

The logic of block 103 is divided into two fully independent sections: one input and one output, which provide for full-duplex completion with no interconnection control by processor 31", which would otherwise be far more complex.

The two registers 104 (ICSR) and 105 (OCSR) connected to logic block 103 are accessible by processor 31" (in the private I/O address space) and consist of:

| | | block 104 (ICSR) (FIG. 9f) |
|---|---|---|
| bit | name | type | function |
| 0 | IC | R/W | Input Clear. Resets the input section, and is also reset by the Master Clear signal controlled by processor 31". |
| 1 | CIBC | R/W | Clear IBC. When activated, generates a pulse for resetting pointer 102 (IBC). |
| 2 | IBF | R/W | IB Full. Indicates buffer 99 (IB) is full; orders processor 31" (via an interrupt of the same name, generated automatically at the end of a transmission regardless of whether it is correct or not) to transfer the content of buffer 99 (IB) to local memory 63"; and |

-continued

| | | block 104 (ICSR) (FIG. 9f) | |
|---|---|---|---|
| bit | name | type | function |
| | | | prevents further access to buffer 99 (IB) as long as it is set to 1. Is reset by the Master Clear signal (MCL) of processor 31" and by IC. |
| 3 | IPTYE | R/WO | Input Parity Error. Indicates a parity error during transmission, and is reset by the MCL + IC signal. |
| 4 | ABRESET | R/W | RESET Enable. When set, allows the RESET signal received from connected unit 14 to be sent on the region bus. Is set to 1 by the MCL signal. |
| 5 | RNAVL | RO | Region Not Available. |

Bits 6 and 7 are not used and are read as 0.

| | | block 105 (OCSR) (FIG. 9g) | |
|---|---|---|---|
| bit | name | type | function |
| 0 | OC | R/W | Output Clear. Resets the output section, and is reset by the MCL signal. |
| 1 | COBC | R/W | Clear OBC. When set, a pulse is generated for resetting pointer 101 (OBC). |
| 2 | START | R/W 1 | Is activated by processor 31" upon filling of buffer 98 (OB) for externally transferring the content of buffer 98 (OB). Automatic resetting after transfer generates an interrupt to processor 38". Is reset by the MCL + OC signal. |
| 3 | OPTYE | R/W 0 | Output Parity Error. Indicates a parity error during transmission, and is reset by the MCL + OC signal. |
| 4 | REST | R/W | RESET. Is sent to connected unit 14 and, if ABRESET = 1, is sent on the region bus. Is reset by the MCL + OC signal. |

Bits 5, 6 and 7 are not used and are read as 0.

A detailed description will now be given of the protocol for communication between two regions 10 on the multiprocessor system according to the present invention.

A message from any processor (on module 17 (P1),18 (PN) or any other module on the system) may be transferred to a processor in another region using a number of techniques provided for by the operating system and which, in any case, comprise a maximum of 7 phases:

(1) If the message (buffer) is in a private memory (34, 34', 34"), it is obviously the job of the processor itself (31, 31', 31") to transfer it to a local region memory (63, 63', 63"), if this is accessible, or, if not, to a local family memory.

(2) In the case of a family-resident "source" processor 31', family master module 17 (P1) transfers the message from family memory 63' to region memory 63 accessible by unit 14.

(3) As buffer 98 resides in its private I/O (FIG. 11d), unit 14 transfers the message from region memory 63 (or 63") to output buffer 98 (OB).

(4) The message is transferred from buffer 98 to buffer 99 (IB) on the other unit 14, connected to the "destination" region, by blocks 103 (HSCL) on the two units 14.

(5) As buffer 99 (IB) resides in its private I/O, "destination" unit 14 transfers the message from buffer 99 (IB) to the region area.

(6) In the case of a family-resident "destination" processor 31', family master module 17 (P1) transfers the message from the region to the family area.

(7) If the message is intended for a private area, it is obviously the job of the "destination" processor to transfer it from the local region or family area.

Transfers 1 and 7 are simple MOVE instructions which may be controlled by single processor 31, 31', 31".

Prior to transfers 2, 3, 5 and 6, controlled by the communications operating system, the family master module 17 is informed by writing its control and status registers (66 and 64), which produces, on module 17, an "exchange request" interrupt with parameters enabling module 17 to perform the transfer.

A detailed examination will now be made of transfer phases 3, 4 and 5 involving two units 14 (IRCU) residing in two regions 10 on the system.

(1) A check is made to ensure buffer 98 (OB) is empty (i.e. START bit 2 on register 105 (OCSR)=0). If it is not, the relative interrupt, generated upon completion of the foregoing operation, is waited for.

(2) Buffer 98 (OB) is filled, i.e. the message is transferred in "reverse" mode from region memory 63 or 63" to a private I/O port, with the addition, at the start of the message, of a Transmission Control Word (TCW), a 32-bit control word indicating the type of transmission:

most significant bit 1: transmission consisting solely of the TCW;

most significant bit 0: transmission of a message whose length, expressed in double words and excluding the TCW, is contained in the TCW. This also provides for fault control, in that, the value may be compared with the content of pointer 102 (IBC) after reception.

(3) As this is a point-to-point full-duplex connection, no mastership problems are involved. Transmissions may be sent out in either direction at any time, by activating the START flag.

(4) Transmission is fully controlled by blocks 103 (HSCL) on the two units 14, including the wait for buffer 98 (IB) on "destination" unit 14, if this has not yet been emptied by the foregoing transmission. At the end of the transmission, transmitting block 103 (HSCL) de-activates START by sending an interrupt to processor 31" on the "source" unit 14, and the receiving block 103 (HSCL) sets IBF by sending an interrupt to processor 31" on the "destination" unit 14.

(5) In the software activating procedure, "source" processor 31":

(1) checks OPTYE (register 105 (OCSR)), i.e. checks it is an end-of-transmission interrupt and not a parity error;

(2) checks hardware-decremented OB pointer 101 equals minus 1; zero-crossover of pointer 101 (OBC), in fact, indicates a correct end of transmission;

(3) resets pointer 101 (OBC).

(6) In the software activating procedure, "destination" processor 31":

(1) checks IPTYE (register 104 (ICSR)), i.e. checks it is an end-of-transmission interrupt and not a parity error;

(2) decrements and saves the content of pointer 102 (IBC), which value indicates the number of received double words (excluding the TCW);

(3) resets pointer 102 (IBC);

(4) reads buffer 99 (IB). As pointer 102 (IBC) points to location 0, the read value is the TCW. If the most significant bit in the TCW is 0, "destination" processor 31": (1) checks the TCW equals the value saved from pointer 102 (IBC); if it does not, this indicates a transmission error;

(2) empties buffer 99 (IB), transfers the content to region memory 63" (operating over 16 or 32 bits), and possibly also informs region master module 17 (P1);

(3) resets pointer 102 (IBC) for further reception;

(4) resets IBF (register 104 (ICSR) and informs block 103 (HSCL) on the connected unit 14 that buffer 99 (IB) is available.

If, on the other hand, the most significant bit in the TCW is 1, "destination" processor 31":

(1) checks the value saved from pointer 102 (IBC) equals 0; if it does not, this indicates a transmission error;

(2) resets pointer 102 (IBC);

(3) resets IBF.

As already stated with reference to FIG. 1, communication between region 10' and a host computer 16 requires the use of an interconnecting unit 14 in region 10' and special hardware (blocks 115, 116) on computer 16. The hardware may employ the standard DMA channels supplied by the maker of computer 16, providing throughput of the channels is sufficient to cater for the requirements of the system according to the present invention. In a demonstration embodiment, the hardware comprises a Digital DR11W module 116 (Standard DMA, half-duplex, with a parallel 16-bit user input/output) and a TDC module 115 (TTL/Differential Converter) for performing the following functions:

(1) enabling half- or full-duplex connection of region 10' and external computer 16 (with 1 or 2 parallel-connected modules 116) for increasing standard throughput;

(2) electrically converting signals from TTL (module 116) to differential (unit 14) for increasing connection length (from 10 to over 100 m);

(3) controlling parity check/generation in both directions;

(4) adapting handshake logic on block 103 and data parallelism (16 on module 116, 32 on unit 14) for enabling standard protocols to be employed both on the host computer 16 and region 10' side.

This results in maximum transparency for the user, with no logic differences between transmitting and receiving between two regions 10 or between computer 16 and region 10'.

As compared with the connection between two units 14, the unit 14 - computer 16 connection presents a number of differences:

(1) Transfers are made in 32 bits, by first "packing" the 16-bit data from external computer 16.

(2) The exchange cycle is increased from 0.15 microseconds a word, on the connection between two units 14, to 3.3–6.3 microseconds on the unit 14, module 115, module 116 connection.

(3) On the computer 16 connection, a message transfer requires a number of operating program calls, instead of just one. On computer 16, in fact, after sending out the instruction, an accept interrupt must be received before starting the DMA. On unit 14, the accept wait and exchange are hardware-controlled, as already stated, by logic block 103. Throughput on the communication channel between region 10' and external computer 16 is thus less than that between two regions 10, though both are a considerable improvement on the current state of the art.

The operating system on the present invention may be controlled by a general purpose kernal, specially designed for real-time services. This may be overlapped by further layers containing typical operating system services. The successive layers are modular in design and operate solely on functions supplied by lower layers. This provides for selecting the "intelligence" level of the operating system on the processor by limiting layering to the required level.

A demonstration embodiment of the system according to the present invention may present eight interconnected regions 10, each region comprising thirty-two families 11, each family 11 comprising one module 17 (P1) and thirty-one modules 18 (PN), and each module 18 (PN) comprising three processors 31', giving a total of 24064 processors.

As already stated, the system according to the present invention provides for performing 32-bit parallel data transfers between the local memory of one module and the local memories of external family- and/or region-resident modules, for the purpose of increasing data exchange throughput by exceeding the (16-bit) word size of the processors 31, 31', 31" directly governing transfer.

Figure 8:
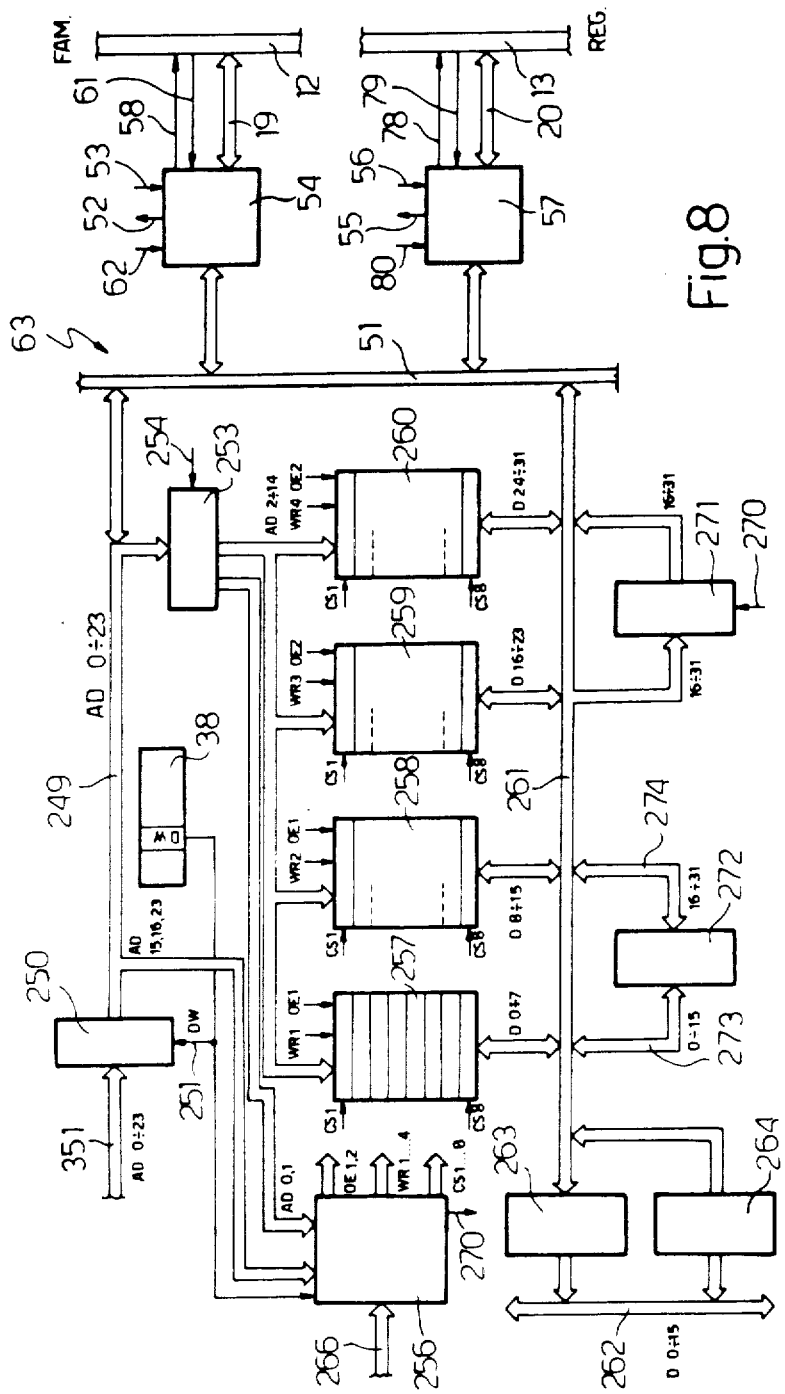
FIG. 8 shows a more detailed block diagram of one embodiment of the local memory on the FIG. 2 module.

FIG. 8 shows a specific example of how local memory 63 is implemented. Address part 351 (0 to 23) of local bus 51 communicates, via address shifter block 250, with a local address bus 249 (0 to 23), in turn, connected, via complete local bus 51, to family and region interfaces 54 and 57 (as shown in FIGS. 6A and 6B) as well as to other blocks as described in more detail later on. The block 250 is controlled by a signal 251 (also sent to block 256 as described in more detail later on) controlled by the double-word flag DW on private control register 38 (FIG. 9a), and which provides for "reconstructing" the addresses in double-word exchanges, as described in more detail later on. The address bus 249 is connected to a latch block 253 controlled by a strobe signal 254 (STLMA) supplied by a logic circuit on local arbitration block 48. The latch supplies the first two address bits (0, 1) to an access logic block 256, and further bits (2 to 14) to four byte wide memory banks, 257, 258, 259, 256, "vertically" sharing local RAM memory 63 and arranged on four groups of lines (0–7, 8–15, 16–23, 24–31 respectively) on part 261 of local bus 51; which part 261 carries the data lines and, in addition to being connected to complete local bus 51 to interfaces 54 and 57, is also connected to part 262 of local bus 51 via an input latch 263 and output latch 264; which part 262 exchanges (16-bit) data with processor 31. The banks 257, 258, 259, 260 are organized so as to be visible as both a 16- and 32-bit word memory, as described in more detail later on. Bus 261 is organized in 32 bits. Each bank 257, 258, 259 and 260 is divided "horizontally" into 8 groups of 4 chips, with common select commands (CS1, . . . , CS8) for the same group in the various banks. Each group is therefore of 32-bit size; each chip in each group obviously also forming part of one of the four byte wide banks already mentioned. Block 256 receives control lines 266 from processor 31, bits 0 and 1 on the address lines from block 253, and bits 15, 16 and 23 on address lines 249; and supplies, depending on the status of address bits 0 and 1: four write commands (WR1 . . . WR4) for each bank 257, 258, 259 and 260, and two read commands (OE1) for banks 257 and 258, (OE2) for banks 259 and 260; and, depending on the status of address bits 15, 16 and 23: select commands (CS1 . . . CS8) in the case of a 256 Kbyte memory. Address bit 23 is used as the most significant selector during decoding, for enabling access at all times to the first unit on memory 63 in the case of region access, and the second unit in the case of family access. The units are selected by commands (CS1, . . . , CS8). Finally, the block 256 supplies an enabling signal 270 for a parking register 271, which receives bits 16 to 31 on data bus 261 and may return the bits to bus 261 as described in more detail later on. The parking register 271 is required to compensate for the physical inability of processor 31 (if 16-bit) to perform 32-bit accessing. Provision is also made for a swapping block 272 for enabling even normal 16-bit access, despite the 32-bit organization of the memory. The block 272 therefore presents two groups of lines, 273, 274, for respectively swapping 0–15- and 16–31-bit data with bus 261.

Access to a given address (byte or word) is therefore first made possible by global decoder 47, which distinguishes the area containing the location. Depending on address bits 0 and 1, access logic block 256 locates the bank (byte access) or pair of banks (word access), or provides for selecting the whole group of four banks (double word access). The remaining address lines define the location within the selected banks.

For expanding local memory 63 to 512 and 1024 Kbytes, bits 17 and 18 on address lines 249 are used for addressing. In the case of a 512 Kbyte memory, block 256 takes into account the status of bits 16, 17 and 23, and a single chip is addressed by lines 2 to 15. In the case of a 1 Mbyte memory, block 256 uses bits 17, 18 and 23, and a single chip is addressed by lines 2 to 16. This is achieved by appropriately "personalizing" block 256 and the relative connections.

As already stated, local RAM memory 63 on module 17 (P1) is accessible by processor 31 on module 17 (P1) and by modules on the family and region buses to which module 17 (P1) is connected.

In all cases, single byte and single word transfers may be operated.

When access is controlled by processor 31, 31', 31" on one of the system modules, data and addresses are exchanged and generated respectively by the processor itself. Module 17 (P1) houses arbitration device 48 which ensures mastership of internal processor 31 on local bus 51 in exchanges controlled by processor 31.

Block 256 generates read and write commands (OE1-2, WR1-4) in accordance with the commands emitted by processor 31.

As described in more detail later on, device 272 ensures processor 31 is allowed full visibility of local RAM memory 63.

In the case of access controlled by external modules, it is again local arbitration block 48 which ensures external mastership of module 17 (P1) on local bus 51 (this time a "slave" during transfer). For single byte or single word exchange, the external module arranges the data on appropriate local bus 261 lines according to address bits 0 and 1.

Block 256 generates read or write commands (OE1-2, WR1-4) in accordance with the commands generated by interface 54 or 57 of the external (family or region) bus 12 or 13 involved, and in accordance with address bits 0 and 1. For double word exchange, the "master" external module arranges (or receives) the double word for exchange on the data lines of family bus 12 or region bus 13, which communicate with local data bus 261 on the slave module. Block 256 generates all the read or write controls simultaneously, in accordance with the commands generated by the external bus interface.

As already stated, according to a characteristic of the present invention, the processor may perform double word transfers between the local memories of region- and family-resident modules (including its own memory, of course), using a special procedure applicable to all commercial microprocessors with a MOVS (memory-to-memory) instruction. In normal operating mode, the procedure provides for transferring n words from a starting address table (s, source) to a starting address table (d, destination). In the demonstration embodiment using an 80286 processor, this is done by performing a MOVE STRING instruction, after first initializing the following work registers on the processor:

DS: (SI), with a descriptor describing the memory segment containing the starting address on the source table (source table pointer);

ES: (DI), with a descriptor describing the memory segment containing the starting address on the destination table (destination table pointer). As described in more detail later on, in the case of a double word transfer, the starting addresses must be half the real starting address.

CX, with half the number of words to be exchanged. Briefly, the processor performs the MOVS instruction by reading the word at the "source" starting address; writing the word at the "destination" starting address; decrementing register CX used as an exchange counter; and incrementing by 2 the source and destination table pointers. It then repeats the read and write operations at the new source and destination addresses so formed, and so on until the exchange counter is zeroed, thus indicating the whole table of n words has been transferred.

According to a characteristic of the present invention, the same may be achieved with half the number of transfers. To do this, when transferring double words, the processor would have to be capable of incrementing the address pointers by 4 (instead of 2) after each read-write operation. As processor 80286 does not provide for this feature, however, it is achieved by initializing the MOVS instruction with source and destination addresses of half their real size, which are then reconstructed by block 250. Before performing a double-word MOVS instruction, the DW (double word) flag on register 38 must be activated for issuing command 251 for selecting block 250. This then shifts the addresses over to the left (multiplication by 2) for recovering halving of the real starting addresses. By so doing, after each access, processor 31 increments its own pointers by 2, whereas the actual addresses supplied to local memory 63 are incremented by 4.

When the master 16-bit processor of a memory-to-memory data transfer reads a given double word, it obviously only acquires one of the two words (even word relative to data lines 0–15) on blocks 257 and 258; the odd word from 16-bit blocks 259 and 260 being stored in register 271 on lines 16–31 of local bus 261. In the double word read cycle, therefore, both commands OE1-2 and command 270 for writing register 271 are generated. In the following write cycle, the even word is located on data lines 261 from 0 to 15 by the processor, the odd word on data lines 261 from 16 to 31 by register 271, and the four destination memory write commands (WR1 . . . WR4) are generated simultaneously.

Briefly, the double word transfer procedure employed on the structure described (FIG. 8) consists of the following phases:

initialize processor register CX (exchange counter) with half the number of words to be transferred;

initialize pointer registers (DS:(SI), ES:(DI) with half the source and destination addresses;

activate the DW flag on register 38;

perform the MOVS instruction;

de-activate the DW flag upon termination of the MOVS instruction.

Single byte and single word access to local memory 63, which are normally provided for on an 80286 type processor 31, must obviously always be permitted in conjunction with possible double word access according to a characteristic of the present invention. 16-bit data bus 262 on processor 31 communicates correctly with 32-bit local data bus 261 via swapping block 272 which, during byte or word access by processor 31 to memory 63 on module 17 (and also during external access), connects data lines 0–15 to data lines 16–31 on local data bus 261. The block 272 is deactivated, however, during double word transfers.

During single byte write operations, and by virtue of the block 272, the "master" controlling the exchange feeds the write data item onto the following local bus 261 lines:

data lines 0 to 7, if address bits 0 and 1 are both L (even byte of even word); block 256 generates WR1 relative to the first RAM bank 257;

data lines 8 to 15, if bit 0=H and bit 1=L (odd byte of even word); WR2 is generated relative to the second RAM bank 258;

data lines 16 to 23, if bit 0=L and bit 1=H (even byte of odd word); WR3 is generated, relative to the third RAM bank 259 (block 272 activated);

data lines 24 to 31, if bits 0 and 1 are both H (odd byte of odd word); WR4 is generated, relative to the fourth RAM bank 260 (block 272 activated).

During single word write operations, the "master" feeds the write data item onto:

data lines 0 to 15, if address bit 1 is L (even word); block 256 generates WR1 and WR2 relative to the first and second RAM banks 257 and 258;

data lines 16 to 31, if address bit 1 is H (odd word; WR3 and WR4 are generated, relative to the other RAM banks 259 and 260 (block 272 activated). During read operations:

banks 257 and 258 feed the data item onto data lines 261 from 0 to 15, if address bit 1 is L. Block 256 activates enabling of tristate outputs OE1 and the whole even word is made available to the exchange master. In the case of a single byte access, the processor on the master considers the byte selected by address bit 0 (on lines 0–7, if bit 0=L, and lines 8–15, if bit 0=H).

banks 259 and 260 feed the data item onto data lines 261 from 16 to 31, if address bit 1 is H. In this case, enabling of tristate outputs OE2 is activated, and the whole odd word is made available to the exchange master and block 272 is activated. In the case of a single byte access, processor 31 on the master considers the byte selected by address bit 0 as described above. When performing single byte or single word exchanges, device 250 ensures perfect matching of the addresses fed by the exchange master onto local address bus 51 and the addresses of the locations being accessed.

In more detail, if the exchange is controlled by processor 31 on the module, 1:1 matching exists between address lines 0–23 on private bus 32, lines 0–23 on bus 51, lines 0–23 on bus 249, and lines 0–16 supplied by block 253. Byte and word exchanges must be performed with the DW flag de-activated, for setting up block 250 in transparent mode.

A characteristic of the present invention provides for combining two techniques—Token Passing and Snapshot to form an original characteristic whereby it is possible to forecast both interrupt waiting time and the exchange time of a given set of data in a multiprocessor environment.

Token passing is used on loop architecture and consists in passing, between the various units on the system, a token authorizing the holder to undertake a given action. The snapshot arbitration method, for granting the system bus resource to one of n agents (masters) sharing the resource, consists in taking a snapshot of the applicants requesting the bus resource at each access request made by any one agent. Within the snapshot, the bus is assigned in "daisy chain" sequence to all the requesting agents.

A further snapshot is taken only after the bus has been assigned to all the agents in the foregoing one. The above characteristic is employed on the multiprocessor system according to the present invention for authorizing only one of the masters connected to the bus to request, within a given snapshot, the transfer of large quantities of data, which transfers are made in "locked burst" mode. (The same snapshot, however, may include n single access requesting masters, wherein n may be the total number of masters on the same bus).

Consequently, by determining beforehand, for the entire system, the maximum size of single messages to be transmitted in locked burst mode (the master retains possession of the bus until the required set of data has been transferred), a fairly accurate estimate can be made of the possible waiting time between a request for access to the bus and its acceptance. In the worst possible case, the time will equal t1 + [(n − 1).t2)], wherein:

t1 = time required for a locked burst exchange, and which may be defined as a system parameter;

t2 = time required for a single exchange;

[(n − 1).t2)] = negligible time in relation to t1;

"n" = total number of master modules.

The possibility of forecasting this time on a multiprocessor system is vitally important for assessing the extent to which the system may be applied to solving various real-time problems.

Furthermore, according to the present invention, the master waiting for access to the bus for performing a locked burst exchange is allowed to work on any other internal processes while waiting for acceptance from the token passing mechanism. This provides for a high degree of efficiency, essential for the application in question, and achieved at very low implementation cost.

Figure 10:
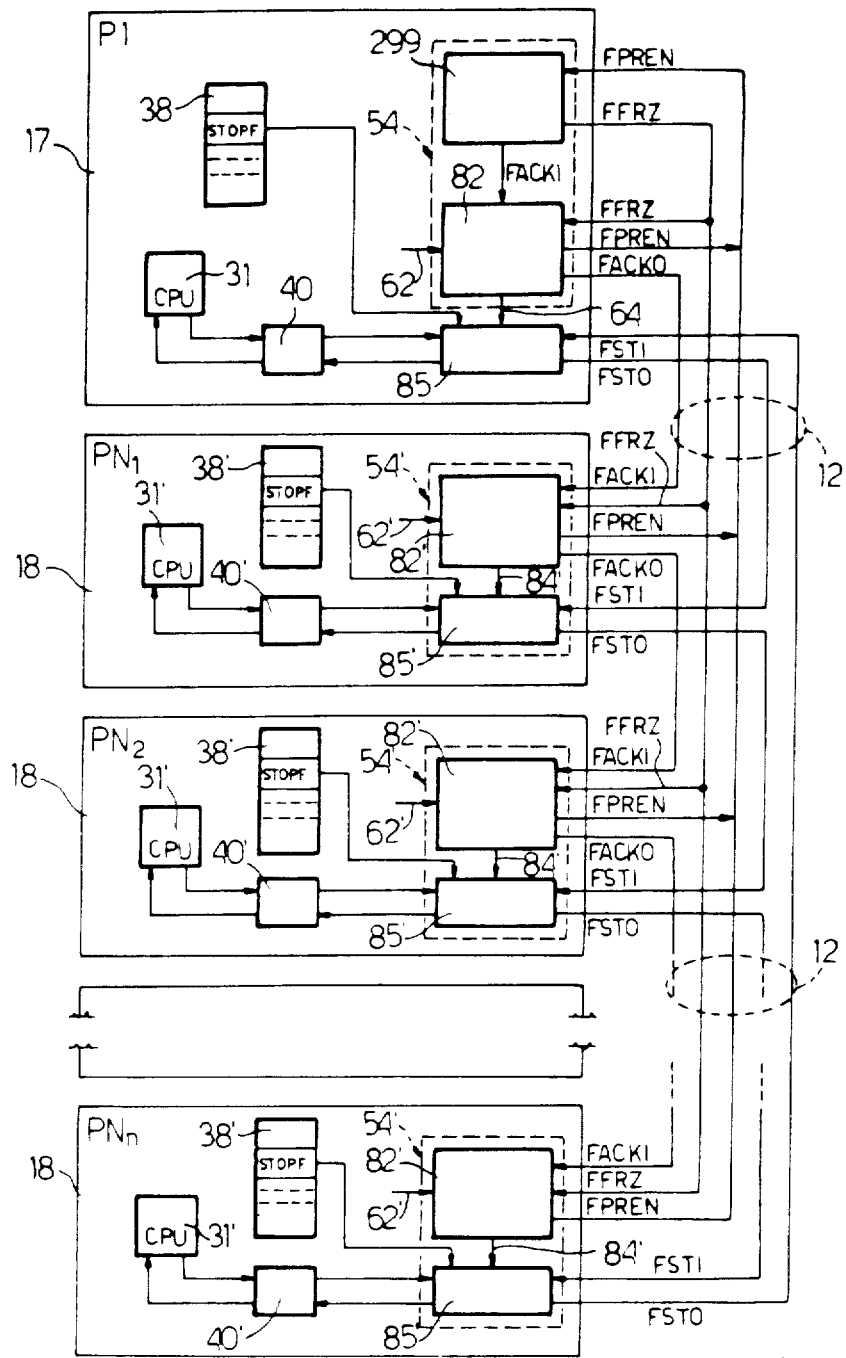
FIG. 10 shows a schematic representation of numbers of modules on the system according to the present invention connected to common communication lines, and internal blocks and signals governing arbitrary communication be tween various modules.

A detailed description will now be given of one embodiment of the characteristic. The same structures are employed for both the system buses (family and region). The family bus structure is shown in FIG. 10, which is limited to the pertinent blocks, and the description of which applies also to the region bus. Modules 17 and 18 connected to family bus 12 are arranged in "daisy chain" formation. Module 17 (P1) is the "lead" module in the family and, as such:

is located in the first slot on family bus 12;

provides for initializing the family token passing technique via dedicated logic on logic control block 85 of family interface 54;

presents a block 299 forming the snapshot circuit, as described in more detail later on, and which control logic block 82 via a FACKI signal.

Each module 17 and 18 presents the devices required for implementing the token passing technique, said devices comprising logic control block 85 or 85' connected respectively to a timer on block 40 or 40'. Each logic block 85 or 85' supplies an output signal FSTO which, via family bus 12, is sent (as input signal FSTI) to logic block 85' on the next module. The loop structure is formed by connecting the FSTO output on the last module 18 to the FSTI input on the first module 17.

The timer on block 40 or 40' generates the time interval module 17 or 18 is allowed, subsequent to receiving the token, for starting or booking performance of a locked burst exchange. Procesor 31 or 31' is allowed direct access for reading the status of timer 40 or 40'. Logic control block 85 or 85' provides for the following functions:

An active FSTI input pulse count-enables timer 40 or 40', and sends an interrupt signal to processor 31 or 31', which may lock or release the count on timer 40 or 40' by means of the STOPF signal on private control register 38 or 38'.

Upon completion of the count, logic control block 85 or 85' disables timer 40 or 40' and sends out an FSTO pulse for passing the token on to the next module.

Via dedicated logic on logic control block 85, processor 31 on module 17 (P1) is allowed to initialize the token passing function.

Each logic block 82 or 82' may supply an FPREN (family booking) signal to family bus 12, which FPREN signal is also sent to block 299 on module 17 (P1). The block 299 may emit an FFRZ lock signal which, again via family bus 12, is sent to each block 82 or 82' on modules 17 and 18. Finally, each logic block 82 or 82' may supply a FACKO output signal, which is sent, as a FACKI signal, to block 82' on the next module.

FPREN is an open-collector signal supplied by each family bus 12 module in the arbitration sequence snapshot. The first high-low transition of the FPREN signal starts the wait cycle on snapshot circuit 299 on module 17 (P1).

The FFRZ signal is generated by snapshot circuit 299 on module 17 (P1), and is activated at the end of the wait period, during which family modules are allowed to book access to bus 12, to prevent further bookings being made at the end of the wait cycle.

The arbitration logic on each module 82 or 82' allows the FACKO acknowledge signal to be sent to the next module (FACKO being switched to high) once the module has terminated access to the bus, or if no bus access request has been made within the allotted booking time.

Operation of the characteristic provided for by the present invention will now be examined in more detail.

For performing locked burst exchanges, processor 31 on module 17 (P1) must first set timer 40 to a given value (depending on factors described in more detail later on). The "upstream" module passes the token on to module 17 (P1) by supplying an FSTI input pulse to block 85 on the P1 module, which, as already described, results in:

an interrupt signal being sent to processor 31, for indicating the possibility of performing locked burst exchanges;

releasing of timer 40, which starts counting from the value programmed by processor 31; which value determines the time interval during which P1 is allowed, subsequent to receiving the interrupt, to decide whether or not to perform locked burst exchanges.

During the interrupt procedure, processor 31 locks the count on timer 40, so as to prevent the count from being terminated and the FSTO signal from being sent to the next modules. Prior to locking the count, however, processor 31 reads the status of timer 40. If the reading is over a given minimum threshold (for preventing ambiguous operation), processor 31 locks the timer and commences performance of the locked burst cycles, upon completion of which, processor 31 releases timer 40 for completing the count. Upon completion of the count, timer 40 is disabled and the token pulse passed on to the next module.

Timer 40 or 40' on the token passing structure of the modules on the bus is normally set to a low value, and the token interrupt is masked. This is changed by processor 31 on the module only when it intends to make use of the locked burst exchange characteristic, in which case, processor 31 or 31' sets timer 40 or 40' to a value unusually permitting it to service the token interrupt within the count, after which, it proceeds to enable the token interrupt.

When the token is passed on to a module not intent on performing locked burst exchanges, the interrupt sent to processor 31 of the module is ineffective (due to it being masked), timer 40 completes the minimum programmed count, and the token is passed on rapidly to the next module.

The system is initialized by module 17 (P1) after all the modules 18 on bus 12 have programmed respective timer 40' to minimum and masked the token passing interrupt. At this point, via dedicated logic on logic block 85, processor 31 on module 17 supplies the first pulse to the token passing structure on module 17, which initializes passing of the token on bus 12.

As already stated, the snapshot technique consists in taking a snapshot of the applicants requesting the bus resource at each bus access request made by any one agent. In this particular case, whenever a module on family bus 12 opts for access to the bus (for obtaining access to the memory or I/O of another family module), block 82 or 82' on the module issues a request to block 299 on module 17 (P1). Upon receiving the first request, the block 299 starts a wait cycle within which other family modules 18 are also allowed to issue similar request, and at the end of which, no further requests for access to bus 12 are accepted.

In other words, only within the time interval may family bus modules send a request to block 299 (i.e. book access to the family bus).

Family bus 12 is then assigned in daisy chain sequence to all the modules that have succeeded in making an access booking.

At the end of the wait cycle, block 299 on module 17 sends an acknowledge signal (FACKI) onto the daisy chain relative to logic blocks 82 for arbitrating all the modules on family bus 12.

The acknowledge signal enables sequential acquisition of bus 12 by all the modules that have succeeded in making an access booking, priority being given to those physically closest to the lead module. Once all the "booked" modules have been allowed access to the bus, another arbitration operation is performed.

In particular, logic arbitration block 82 on module 17 (P1) (identical to that on the other family modules 18) activates the family bus FPREN signal, providing the following conditions are met:

processor 31 on module 17 is intent on access to family bus 12;

the FFRZ signal is still inactive, indicating that block 299 on module 17 (P1) is still allowing access bookings to be made.

The FPREN signal may thus be issued simultaneously by a number of modules, i.e. all the modules managing to book access to the bus within the arbitration cycle. The first off-on transition of the FPREN signal activates the logic on block 299 which provides for sequentially activating the FFRZ and FACKI signals.

Activation of the FFRZ signal prevents other modules from booking access (and therefore contributing towards activating the FPREN signal). The FACKI signal is first sent to logic arbitration block 82 on module 17 (P1).

If processor 31 on module 17 (P1) has also succeeded in booking, the request from module 17 (P1) is the first to be serviced, and the FACKO output of logic block 82 on P1 remains inactive (thus preventing the acknowledge signal from being issued) until processor 31 on P1 has completed external access. At this point, P1 allows the acknowledge signal to be issued (by activating the FACKO signal) and removes its own contribution toward activation of the FPREN signal. Bus 12 is then assigned sequentially to lower-priority modules 18 (physically furthest from module P1). Once the last booked module 18 has completed access to bus 12, the FPREN signal is de-activated, which results in de-activation of logic 299 on module P1 and removal of the FFRZ and FACKI signals which are thus ready for another arbitration operation.

The advantages of the multiprocessor system according to the present invention will be clear from the foregoing description. In particular, the architecture of the system, based on five hierarchical levels (private, local, family, region, and region network), provides for efficient control of extremely extensive configurations, on which may cooperate thousands of last generation microprocessors, thus enabling a considerable improvement in computing power as compared with prior multiprocessor systems. Endowing each level with its own hardware and software provides for two characteristics that are essential on a multiprocessor system: independent processing at each level, and efficient cooperation between different levels. The system according to the present invention, in fact, provides for extremely efficient joint operation of two typical multiprocessing modes: multiprocessor mode (with direct access to common communication lines and, therefore, direct visibility of the global memory); and multicomputer mode (region network) with message exchange between various multiprocessor sections (regions), or, possibly, with sections of an auxiliary (host) computer; such being achieved by virtue of fully independent operation of the connection between various multiprocessor sections (regions) as compared with operation of the sections themselves; the local "intelligence" of the various modules involved; and the data exchange throughput such intelligence affords.

A further advantage of the multiprocessor system according to the present invention is that it provides for data exchange on the communication lines between modules on a shared-memory multiprocessor system, the parallelism of which exchange is twice (and possibly even more than twice) the word size of the microprocessors employed, thus providing for an equivalent increase in data exchange throughput, and for minimizing and forecasting interrupt wait time and data exchange between modules; such being achieved using only limited means involving low accessory cost to the system, by virtue of the characteristics being implemented by way of additional features on existing basic system modules.

Finally, considerable functional advantages are afforded by the high-capacity memory connectable directly to the region and family buses; which memory provides for exceeding the addressing limits of each module; dynamically switching memory data from one module to another - the equivalent of transferring data at practically infinite speed; and dynamically creating areas common to different modules, possibly with different access rights.

To those skilled in the art it will be clear that changes may be made to the embodiment of the system described and illustrated herein without, however, departing from the scope of the present invention. For example, a family 11 may comprise only one module 17 (P1) and several modules 18 (PN) with no blocks 22 or 23. Similarly, only a number of regions 10 may be connected to region 10'.

We claim:

1. A multiple-hierarchical-level multiprocessor system, comprising a plurality of regions (10) of families (11) of processor modules (17, 18), each of said modules comprising at least one processor (31, 31'), and each of said modules in each of said families being connected to a first common direct access communication line (12) for each of said families, the family of modules so connected thereby constituting a first hierarchical-level; wherein a first processing module (17) of each of said families (11) in each of said regions (10) is also connected to a second common direct-access communication line (13), the region of families so connected thereby forming a second hierarchical level; and wherein a plurality of said second lines (13) are connected to one another by data transmitting and receiving means (14), the region network so connected thereby forming a third hierarchical level; said plurality of transmitting and receiving means (14) each comprising at least one processor (31") enabling independent operation of said processor modules (17, 18).

2. The invention according to claim 1, wherein each of said processing modules (17, 18) comprises, assigned to each processor (31, 31'): a common private-level communication line (32, 32'), and private memory means (34, 34') and private input-output means (37, 37') connected to said common private-level communication line (32, 32'); a plurality of common local-level communication lines (51, 51'); and local memory means (63, 63') connected to said local-level communication lines (51, 51') and to said private input-output means (37, 37'); wherein said private input-output means (37, 37') is separable from said local-level communication line (51, 51').

3. The invention according to claim 2, further comprising coprocessors (33, 33') assigned to at least one of said processors (31, 31').

4. The invention according to claim 2, wherein said private input-output means (37, 37') comprises timing means (40, 40'), control (38, 38') and status (39, 39') registers, and interrupt signal control means (41, 41'), each connected to said common private-level communication lines (32, 32').

5. The invention according to claim 2, wherein said processing modules (18) other than said first processing modules (17) are connected solely to said first direct-access communication line (12), and wherein each comprises a plurality of said processors (31').

6. The invention according to claim 2, wherein said processing modules (17, 18) each comprise means for detecting requests for connecting said local-level communication lines (51, 51') to said private-level communication lines (32, 32') or to said first (12) or second (13) direct-access communication lines, and for enabling direct-access connection of said communication lines (12, 13, 32, 32', 51, 51') in accordance with an associated request priority sequence.

7. The invention according to claim 1, further comprising means (67, 68) for sending data from one of said processor modules (17, 18) to at least one other processor module (17, 18) connected to the same group of direct-access communication lines (12, 13) as said one processor module (17, 18).

8. (New) The invention according to claim 1, wherein said data transmitting and receiving means (14) further comprises first means (98) for temporarily storing data for transmission, second means (99) for temporarily storing received data, and means (101, 102, 103, 104, 105) addressing said first (98) and second (99) means for controlling exchange of said data; said control means (101, 102, 103, 104, 105) being controlled by said processor (31") of said data transmitting and receiving means (14).

9. The invention according to claim 8, wherein said data transmitting and receiving means (14) comprises: a common private-level communication line (32"), and private memory means (34") and private input-output means (37") connected to said common private-level communication line (32"); a plurality of common local-level communication lines (51"); and local memory means (63") and local input-output means connected to each of said local-level communication lines (51"); wherein said private memory (34") and input-output (37") means are separable from said local-level communication lines (51"); and wherein said system further comprises interface means (57") for connecting said local-level communication lines (51") to said second direct-access communication lines (13) at said second hierarchical level.

10. The invention according to claim 1, wherein said data transmitting and receiving means (14) comprises TTL-differential and differential-TTL signal converting means (95, 96, 95', 96').

11. The invention according to claim 1, further comprising a second main regional group (13') of common communication lines at said second hierarchical level, wherein at least one of said common communication direct-access lines (13) are connected to said lines of said second main regional group (13') by a subset of said data transmitting and receiving means (14); and further comprising external processing means (16) to which said lines of said second main regional group (13') are connected by others of said transmitting and receiving means (14) not of said subset.

12. The invention according to claim 1, further comprising at least one memory means (22) connected in direct access manner to both said first (12) and said second (13) groups of common communication lines.

13. The invention according to claim 12, wherein said memory means (22) offers a high addressing capacity in access of the addressing capacity of said processing modules (17, 18) connected to said first (12) and said second (13) group of communication lines.

14. The invention according to claim 12, wherein, for each group of address data from said first (12) and said second (13) group of common communication lines, said memory means (22) comprises match coding means (168, 168') for a first part (165, 165') of each of said groups of address data, the remainder (173, 173') of each of said groups of address data being reunited with said part obtained from said match coding means (168, 168'); and wherein said system further comprises selecting means (161, 182) for selecting a complete group of said address data to be supplied to a memory block (150).

15. The invention according to claim 14, wherein said first part of said group of said address data sent to said match coding means (168, 168') is the most significant part.

16. The invention according to claim 14, wherein said match coding means (168, 168') comprises read-and-write memory means.

17. The invention according to claim 14, wherein read or write data from said memory block (150) is exchanged on said first (12) or said second (13) group of common communication lines by registers (154, 156; 155, 157).

18. The invention according to claim 1, wherein said first (12) and said second (13) group of communication lines and said data transmitting and receiving means (14) are adapted to provide a data exchange parallelism which is a multiple of the word size of said processors (31, 31', 31"); and wherein said system further comprises interface means (63, 261, 250) between said processors (31, 31', 31") and said common communication lines (12, 13) for achieving said multiple parallelism.

19. The invention according to claim 18, wherein said data exchange parallelism is twice the word size of said processors (31, 32', 31").

20. The invention according to claim 18, wherein said interface means comprises a data exchange part (261) in said common local-level communication line (51) providing said multiple parallelism; wherein said data exchange part (261) comprises lines connected to a plurality of memory banks (257, 258, 259, 260) connected to address lines (249) from said processors (31, 31', 31") through address altering means (250) or from external processing modules (17, 18, 14); and wherein said address altering means (250) is deactivated when the parallelism of said data exchanged between said processing modules is the same as or a submultiple of said word size of said processors (31, 31', 31").

21. The invention according to claim 20, further comprising a plurality of direct lines connected to single elements of said memory banks (257, 258, 259, 260), and a plurality of address lines connected to said logic blocks (256); wherein said single elements are addressed in response to both said direct lines and signals derived from said logic blocks (256).

22. The invention according to claim 20, wherein any of said data exchange lines (261) of said common local-level communication lines (51) which exceed the word size of said processors (31, 31', 31") are interconnected by temporary memory means (271), and are connected by interconnecting means (272) to the part of said data exchange lines (261) included within the word length of said processors (31, 31', 31").

23. The invention according to claim 1, further comprising means (54, 31, 40, 38, 57) for enabling single communication exchange between all of said modules (17, 18, 14) connected to the same first (12) and second (13) group of common communication lines and which emit an exchange request signal (FPREN) within a predetermined time period; and for enabling a locked multiple communication exchange by only an authorized one of said modules (17, 18, 14), so as to substantially enable forecasting of both an interrupt signal wait time and an exchange time for a given set of data.

24. The invention according to claim 23, further comprising interfaces (54, 54', 57, 57") connecting said modules (17, 18, 14) to said first (12) or said second (13) group of common communication lines, wherein said single and locked multiple communication exchange enabling means (54, 31, 40, 38, 57) form at least part of said interfaces (54, 54', 57, 57").

25. The invention according to claim 24, wherein said single and locked multiple communication enabling means (54, 31, 40, 38, 57) are controlled by said processors (31, 31', 31") by the status of internal registers (38, 38', 38"), and by timing means (40, 40', 40"), in said modules.

26. (New) The invention according to claim 23, wherein said single and locked multiple common communication exchange enabling means (54, 31, 40, 38, 57) of each of said modules (17, 18, 14) are connected in daisy chain fashion, and wherein said first one (17) of said modules comprises initializing means (299, 85).

27. (New) The invention according to claim 2, further comprising means (47, 47', 47") for each of said processing modules (17, 18, 14) for decoding requests from said processor (31, 31', 31") for direct access to private, local, family or region areas of said memory means (34, 63, 63', 63"), and of said input-output means of said processing modules (17, 18) or said interconnecting means (14).

28. The invention according to claim 1, wherein a few of said processors (31') of each of said processing modules (18) are connected solely to said first (12) group of said common communication lines, wherein a few tens of said processing modules (18) are connected solely to said first (12) group of lines, and wherein a few tens of families (11) of processing modules (17, 18) are connected to said second (13) group of common communication lines, and a few regions (10) of families (11) are interconnected by said data transmitting and receiving means (14).

* * * * *